United States Patent
O et al.

(10) Patent No.: US 11,860,793 B2
(45) Date of Patent: Jan. 2, 2024

(54) CONTROLLER, COMPUTING SYSTEM INCLUDING THE SAME, AND METHOD OF CREATING AND SEARCHING PAGE TABLE ENTRY FOR THE SAME

(71) Applicant: SAMSUNG ELECTRONICS CO., LTD., Suwon-si (KR)

(72) Inventors: Seongil O, Suwon-si (KR); Won Woo Ro, Seoul (KR); William Jinho Song, Seoul (KR); Jiwon Lee, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/526,391

(22) Filed: Nov. 15, 2021

(65) Prior Publication Data
US 2022/0342828 A1 Oct. 27, 2022

(30) Foreign Application Priority Data
Apr. 27, 2021 (KR) .................. 10-2021-0054195

(51) Int. Cl.
*G06F 12/109* (2016.01)
(52) U.S. Cl.
CPC ...... *G06F 12/109* (2013.01); *G06F 2212/651* (2013.01); *G06F 2212/657* (2013.01)
(58) Field of Classification Search
CPC ............. G06F 12/109; G06F 2212/651; G06F 2212/657
See application file for complete search history.

(56) References Cited

U.S. PATENT DOCUMENTS

| | | |
|---|---|---|
| 6,970,990 B2 | 11/2005 | Rogers et al. |
| 7,117,337 B2 | 10/2006 | Chiang et al. |
| 7,895,410 B1 | 2/2011 | Wu |
| 9,436,616 B2 | 9/2016 | Sharp et al. |
| 9,588,902 B2 | 3/2017 | Terry et al. |
| 9,965,399 B2 | 5/2018 | Agesen |
| 10,261,916 B2 | 4/2019 | Awad et al. |
| 10,459,852 B1 | 10/2019 | Michaud |
| 10,891,241 B2 | 1/2021 | Zheng et al. |
| 2004/0078631 A1 | 4/2004 | Rogers et al. |
| 2005/0188176 A1 | 8/2005 | Chiang et al. |
| 2014/0156968 A1 | 6/2014 | Terry et al. |
| 2014/0331023 A1 | 11/2014 | Sharp et al. |
| 2017/0212843 A1 | 7/2017 | Agesen |
| 2017/0277639 A1 | 9/2017 | Awad et al. |
| 2019/0102318 A1 | 4/2019 | Zheng et al. |
| 2021/0089470 A1* | 3/2021 | Hao ............... G06F 12/1027 |

* cited by examiner

*Primary Examiner* — Gurtej Bansal
(74) *Attorney, Agent, or Firm* — Sughrue Mion, PLLC

(57) ABSTRACT

A controller is provided. The controller creates a page table including page table entries including mapping information for translating a virtual address to a physical address. Each of the page table entries includes: a virtual page number, a physical frame number, valid information, and size information. The virtual page number is included in a virtual address, the physical frame number is included in a physical address, the valid information includes a first predetermined number of bits, and the size information includes a second predetermined number of bits. The first predetermined number of bits represents an address translation range in a page table entry or a number of page table entries to be grouped, and the size information represents a size indicated by each bit of the first predetermined number of bits.

20 Claims, 17 Drawing Sheets

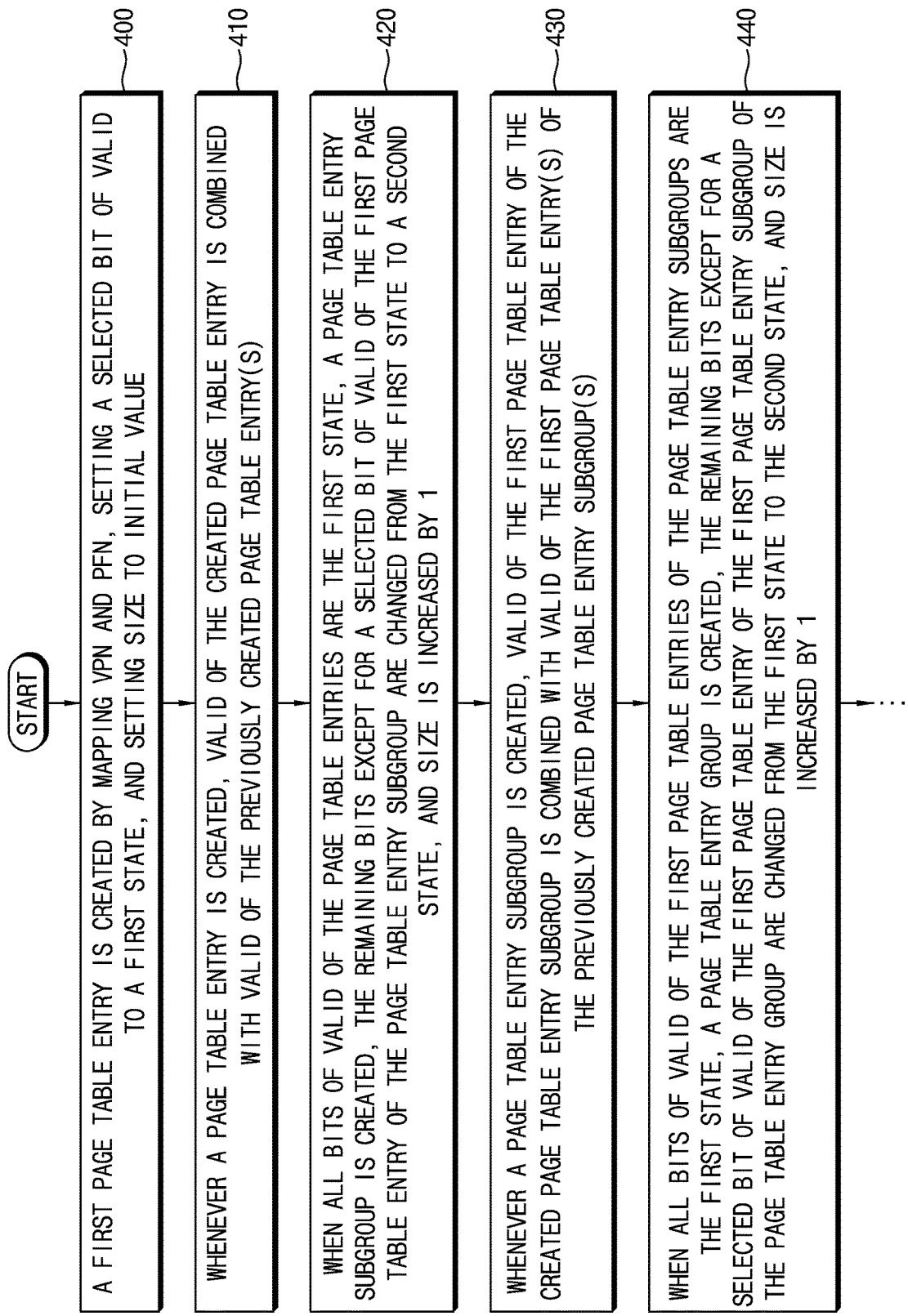

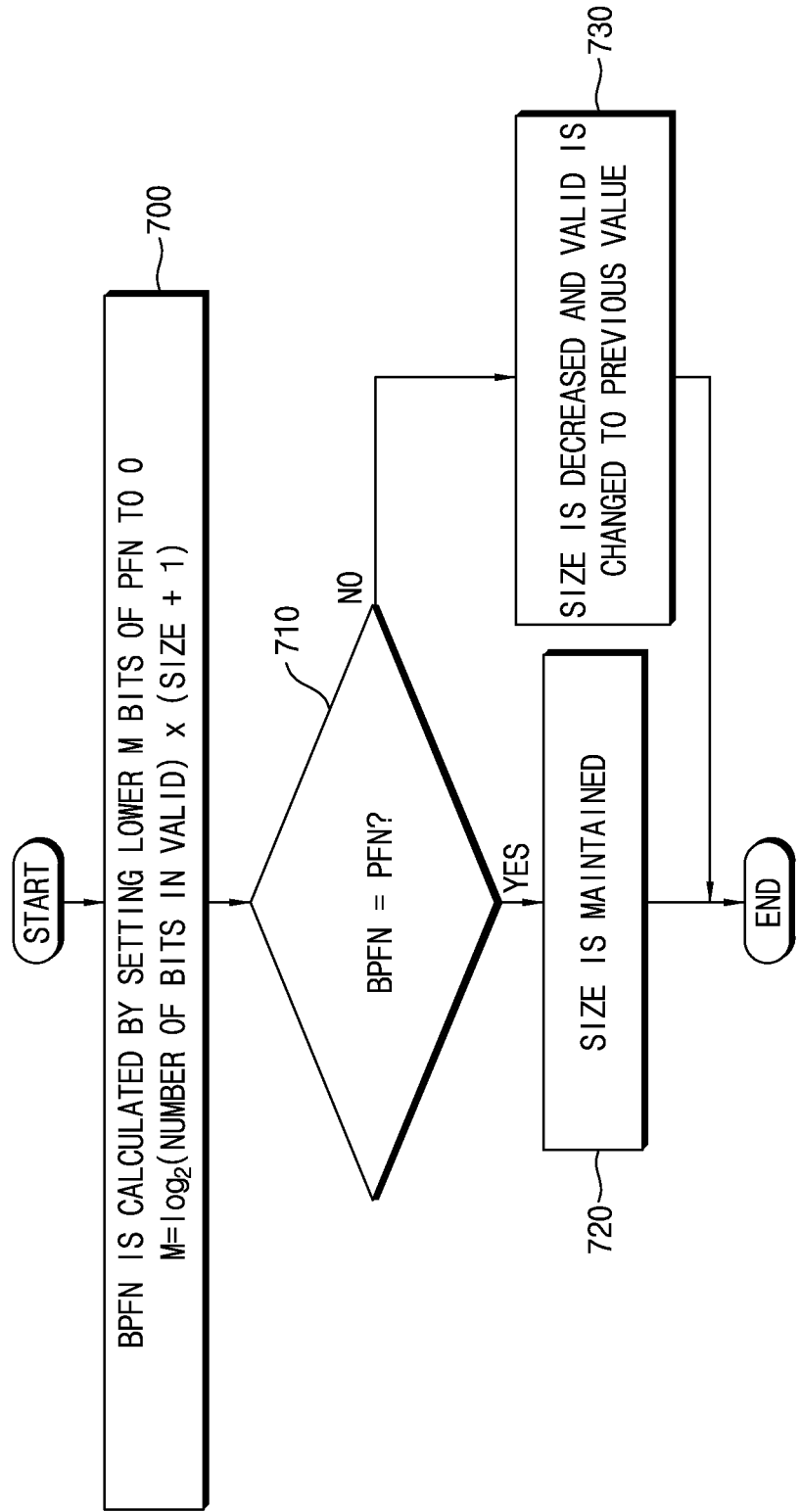

CONTROLLER, COMPUTING SYSTEM INCLUDING THE SAME, AND METHOD OF CREATING AND SEARCHING PAGE TABLE ENTRY FOR THE SAME

CROSS-REFERENCE TO THE RELATED APPLICATION

This application claims priority from Korean Patent Application No. 10-2021-0054195, filed on Apr. 27, 2021, in the Korean Intellectual Property Office, the disclosure of which is incorporated herein by reference in its entirety.

BACKGROUND

1. Field

The disclosure relates to a controller, a computing system including the same, and a method of creating and searching a page table entry for the same.

2. Description of the Related Art

Generally, all hardware and software of a computer system may be managed and controlled by an operating system (OS). The hardware may include a controller(e.g., a central processing unit (CPU)), a main memory, and a peripheral device, and the software may be a program created for the purpose of executing a specific instruction.

The controller may load a program stored in a virtual memory into a physical memory of a main memory to execute the program (or process). For this purpose, the controller may create a page table including mapping information to translate or convert (hereafter "translate") a virtual page number indicating a virtual page of the virtual memory to a physical frame number indicating a physical frame of the main memory.

SUMMARY

The example embodiments of the disclosure provide a controller capable of varying the size of a page table according to the data size (or capacity) of a program (or process), a computing system including the same, and a method of creating and searching a page table entry for the same.

Objects of the embodiments are not limited to the aforementioned object, and other unmentioned objects will be clearly understood by those skilled in the art based on the following description.

In accordance with an embodiment, a controller may be configured to create a page table including page table entries including mapping information for translating a virtual address to a physical address. Each of the page table entries may include a virtual page number, a physical frame number, valid information, and size information. The virtual page number may be included in a virtual address, the physical frame number may be included in a physical address, the valid information may include a first predetermined number of bits, and the size information may include a second predetermined number of bits. The first predetermined number of bits may represent an address translation range in a page table entry or the number of page table entries to be grouped, and the size information may represent a size indicated by each bit of the first predetermined number of bits.

In accordance with an embodiment, a computing system may a controller configured to create a page table including page table entries including mapping information for translating a virtual address to a physical address, and store a part of the page table entries, and a main memory including a physical memory and configured to store the page table in the physical memory. Each of the page table entries may include a virtual page number, a physical frame number, valid information, and size information. The virtual page number may be included in a virtual address, the physical frame number may be included in a physical address, the valid information may include a first predetermined number of bits, and the size information may include a second predetermined number of bits. The first predetermined number of bits may represent an address translation range in a page table entry or the number of page table entries to be grouped, and the size information may represent a size indicated by each bit of the first predetermined number of bits.

In accordance with an embodiment, there is provided a method of creating and searching a page table entry in a computing system including a controller configured to create a page table including page table entries including mapping information for translating a virtual address to a physical address, and store a part of the page table entries, and a main memory including a physical memory and configured to store the page table in the physical memory. The method may include creating a page table entry including a virtual page number, a physical frame number, valid information, and size information. The virtual page number may be included in a virtual address, the physical frame number may be included in a physical address, the valid information may include a first predetermined number of bits, and the size information may include a second predetermined number of bits. The first predetermined number of bits may represent an address translation range in a page table entry or the number of page table entries to be grouped, and the size information may represent a size indicated by each bit of the first predetermined number of bits.

BRIEF DESCRIPTION OF THE DRAWINGS

FIG. 4 is a flowchart illustrating a method of creating a page table entry in a controller according to an embodiment.

FIG. 7 is a flowchart illustrating a method of creating a page table entry by a controller according to an embodiment.

DETAILED DESCRIPTION

With reference to the attached drawings, a description will be given below of a computing system and a method of creating and searching a page table entry for the computing system according to embodiments.

Figure 1:
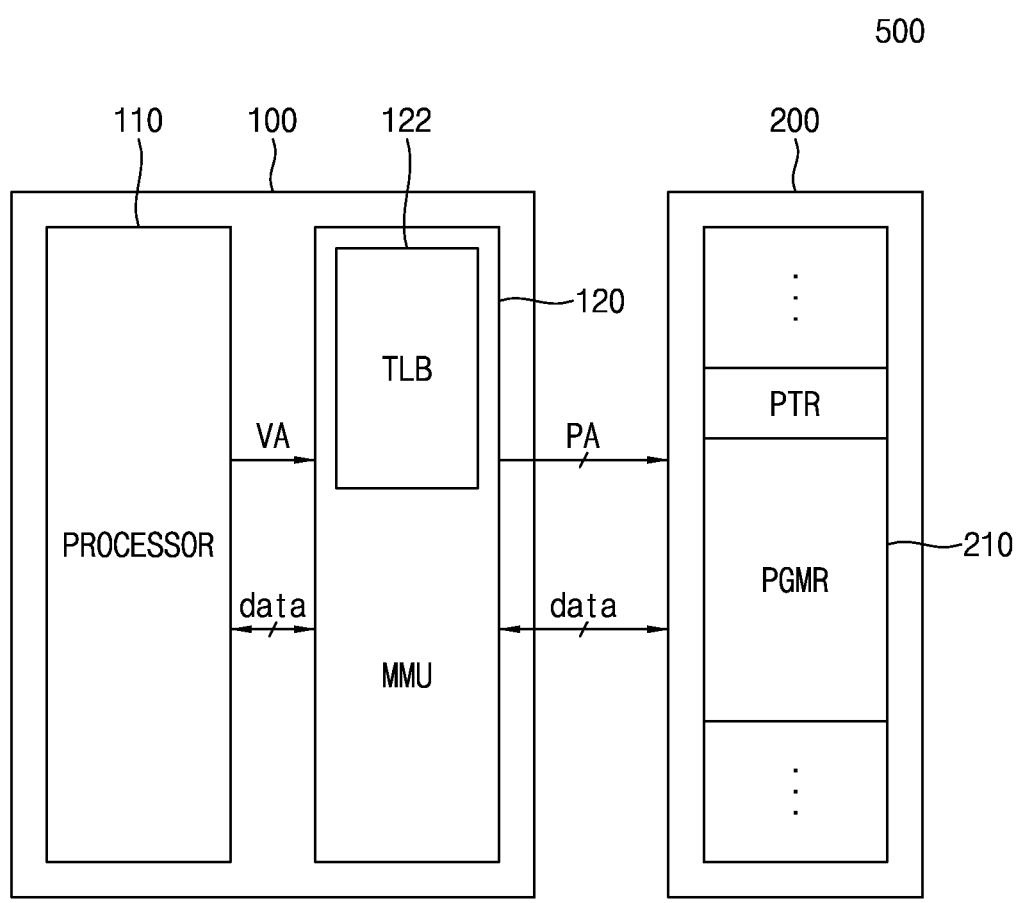
FIG. 1 is a block diagram illustrating a computing system, according to an embodiment.

FIG. 1 is a block diagram illustrating a computing system, according to an embodiment. A computing system 500 may include a controller 100 and a main memory 200. The controller 100 may be a central processing unit (CPU), and include a processor 110, a memory management unit (MMU) 120, and a translation lookaside buffer (TLB) 122. The main memory 200 may include a physical memory 210. The main memory 200 may be implemented by a dynamic random-access memory (DRAM), a static random-access memory (SRAM), or a non-volatile memory, not being limited thereto. The MMU 120 may be implemented by a hardware and/or software module controlled by the processor 110.

The function of each of the blocks illustrated in FIG. 1 will be described below.

The processor 110 may create a page table entry including mapping information for translating a virtual address VA of a virtual memory (not shown) to a physical address PA of the physical memory 210, and generate the virtual address VA and data (e.g., a page table entry included in a page table) by an operating system (OS). To store a program stored in the virtual memory (not shown) indicated by the virtual address VA of the virtual memory (not shown) in a program area PGMR indicated by a physical address PA of the physical memory 210 in the main memory 200 by the OS, the processor 100 may generate the virtual address VA and data (i.e., the program).

The MMU 120 may receive the virtual address VA and the data (e.g., the page table entry), store a part of the page table entry in the TLB 122, and transmit a physical address PA and data DATA (i.e., the page table entry included in the page table) to the main memory 200 by the OS. The MMU 120 may receive the virtual address VA and the data (i.e., the program) from the processor 110, and transmit to the main memory 200 the physical address PA and the data DATA (i.e., the program) mapped to the virtual address VA by using the page table entry stored in the TLB 122. In the absence of the page table entry for the virtual address VA in the TLB 122, the MMU 120 may read the page table entry (e.g., a first page table entry of a subgroup (or group) including the page table entry for the virtual address VA) stored in a page table area PTR of the physical memory 210, store the page table entry in the TLB 122, and generate the physical address PA mapped to the virtual address VA by the OS.

The TLB 122 may store a part of the page table entry. The TLB 122 may further include additional information in addition to the part of the page table entry. Unlike FIG. 1, the TLB 122 may reside separately outside the MMU 120.

The main memory 200 may store the data DATA (i.e., the page table entry included in the page table) in the page table area PTR of the physical memory 210, indicated by the physical address PA, and store the data DATA (i.e., the program) in the program area PGMR of the physical memory 210. While not shown, the OS may be stored in an OS storage area (not shown) of the physical memory 210 to manage or control the controller 100, the main memory 200, and programs.

That is, the controller 100 may create a page table including page table entries for the program, store a part of the page table entries in the TLB 122, and store the page table in the main memory 200.

Figure 2:
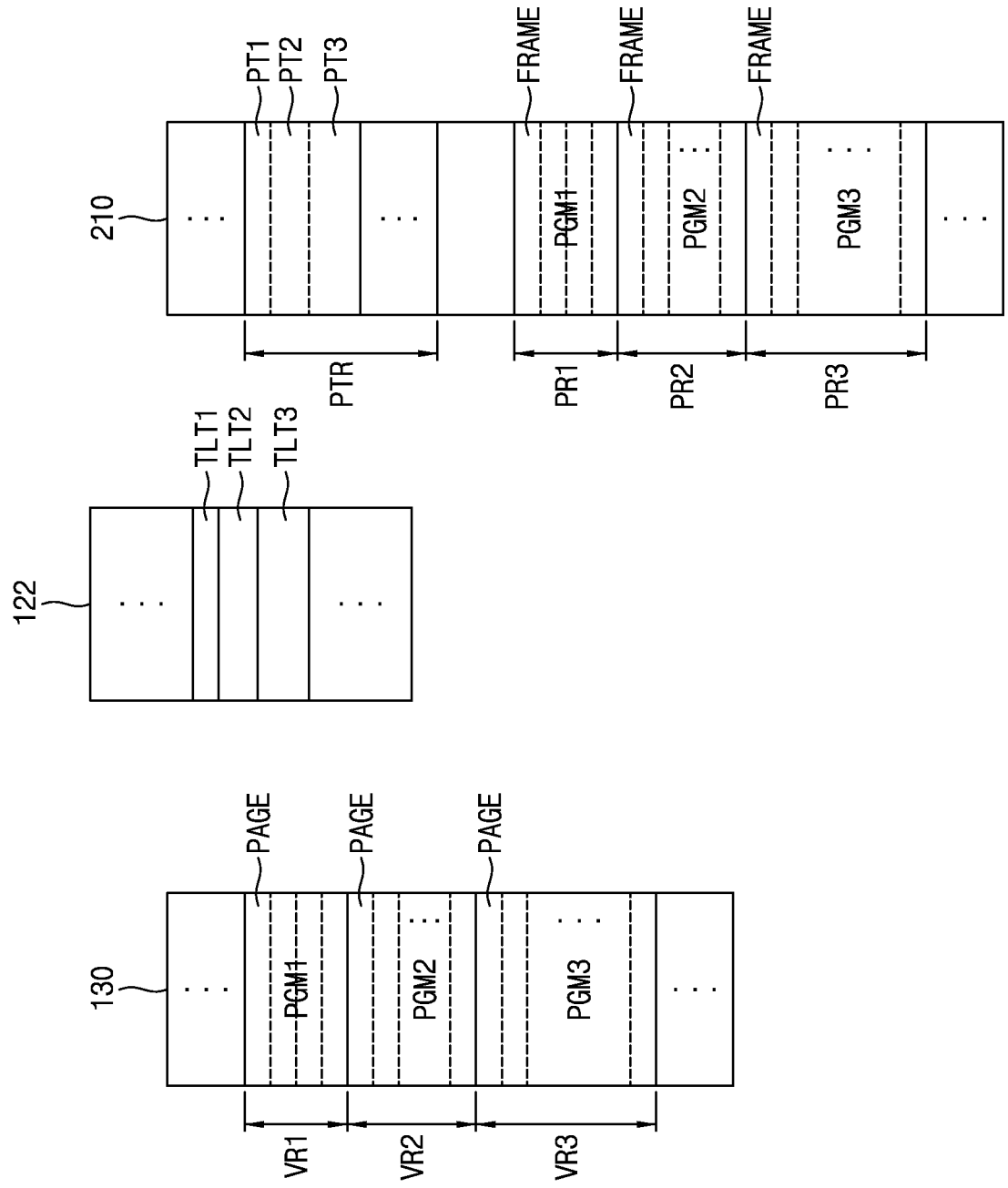
FIG. 2 is a diagram illustrating the virtual memory 130, the physical memory 210, and the TLB 122, according to an embodiment.

FIG. 2 is a diagram illustrating the virtual memory 130, the physical memory 210, and the TLB 122, according to an embodiment.

Referring to FIG. 2, the virtual memory 130 may be divided into a plurality of pages and store a plurality of programs, for example, three programs PGM1, PGM2, and PGM3, in a plurality of virtual memory areas, for example, three virtual memory areas VR1, VR2, and VR3. The three programs PGM1, PGM2, and PGM3 may have different data sizes (capacities), and may be stored in the three virtual memory areas VR1, VR2, and VR3 including different numbers of pages. For example, the program PGM1 may be stored in the virtual memory area VR1 including four (4) pages, the program PGM2 may be stored in the virtual memory area VR2 including eight (8) pages, and the program PGM3 may be stored in the virtual memory area VR3 including 16 pages.

Similarly, the physical memory 210 may be divided into a plurality of frames and store a plurality of programs, for example, the three programs PGM1, PGM2, PGM3 in a plurality of physical memory areas, for example, three program areas PR1, PR2, and PR3. The three program areas PR1, PR2, and PR3 may be included in the program area PGMR illustrated in FIG. 1. As described above, since the three programs PGM1, PGM2, and PGM3 have different data sizes (capacities), they may be stored in the three program areas PR1, PR2, and PR3 including different numbers of frames. For example, the program PGM1 may be stored in the program area PR1 including four (4) frames, the program PGM2 may be stored in the program area PR2 including eight (8) frames, and the program PGM3 may be stored in the program area PR3 including 16 frames. The physical memory 210 may further include the page table area PTR and store a page table PT1 for the program PGM1, a page table PT2 for the program PGM2, and a page table PT3 for the program PGM3 in the page table area PTR. The sizes of the page tables PT1, PT2, and PT3 may be different according to the data sizes (capacities) of the programs.

The TLB 122 may store a part TLT1 of page table entries for the program PGM1, a part TLT2 of page table entries for the program PGM2, and a part TLT3 of page table entries for the program PGM3.

Figure 3A:
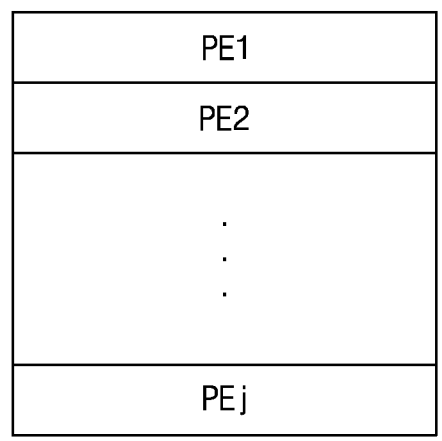
FIGS. 3A and 3B are diagrams illustrating a page table and the format of a page table entry according to an embodiment.
Figure 3B:
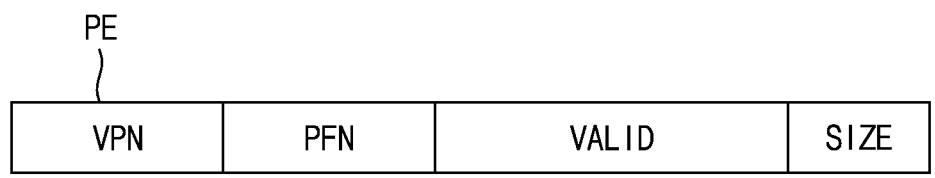

FIGS. 3A and 3B are diagrams illustrating a page table and a format of a page table entry, according to an embodiment.

Referring to FIG. 3A, a page table PT may include a variable number of (e.g., j) page table entries PE1 to PEj according to a data size of a program. That is, when the program is stored in j pages, j page table entries PE1 to PEj may be created.

Referring to FIG. 3B, each of the page table entries PE may include a virtual page number VPN, a physical frame number PFN, valid information VALID, and size information SIZE. The virtual page number VPN is upper bits of a starting virtual address VA of a page in the virtual memory 130, and the physical frame number PFN is upper bits of a starting physical address PA of a frame in the physical memory 210. The valid information VALID may include a first predetermined number of bits. The first predetermined number of bits may represent an address translation range or the number of page table entries that may be grouped (the number of page table entry subgroups (or groups)). The size information SIZE may include a second predetermined number of bits, and specify a size represented by each bit of the first predetermined number of bits. For example, when each of the size of one page and the size of one frame is 4 KB, the virtual page number VPN is represented by upper bits except for the lower 12 bits of the starting virtual address VA, and the physical frame number PFN may be represented by upper bits except for the lower 12 bits of the starting physical address PA. When the first predetermined number of bits are four (4) bits, whenever one bit of the first predetermined number of bits is changed from a second state (e.g., "0") to a first state (e.g., "1"), the address translation range may increase by 1, 2, 3, or 4 times. For example, when each bit (corresponding to each page) of the first predetermined number of bits indicates 4 KB, the size information SIZE may be 0 (="00"), when each bit (i.e., each page) of the first predetermined number of bits indicates 16 KB, the size information SIZE may be 1 (="01"), and when each bit (i.e., each page) of the first predetermined number of bits indicates 64 KB, the size information SIZE may be 2 (="10").

FIG. 4 is a flowchart illustrating a method of creating a page table entry in a controller, according to an embodiment.

Referring to FIG. 4, in operation 400, a page table entry is created by assigning a corresponding virtual page number to a virtual page number VPN, a corresponding physical frame number to a physical frame number PFN, a first state (e.g., "1") to a selected bit (e.g., the first upper bit) of valid information VALID and a second state (e.g., "0") to the remaining bits of the valid information VALID, and an initial value (e.g., 0) to size information SIZE.

In operation 410, whenever a page table entry is created, valid information VALID of the created page table entry is combined with valid information VALID of a previously created page table entry(s). That is, whenever a page table entry is created, the number of bits set to the first state in valid information VALID of the page table entry may increase.

In operation 420, when all bits of the valid information VALID of the page table entries are set to the first state, a page table entry subgroup may be created, the remaining bits except for the selected bit (e.g., the first upper bit) of the valid information VALID of a first page table entry of the page table entry subgroup may be changed from the first state to the second state, and the size information SIZE may increase to 1.

In operation 430, whenever a page table entry subgroup is created, valid information VALID of a first page table entry of the created page table entry subgroup is combined with valid information VALID of a first page table entry(s) of a previously created page table entry subgroup(s). That is, whenever a page table entry subgroup is created, the number of bits set to the first state in valid information VALID of the first page table entries of the page table entry subgroups may increase.

In operation 440, when all bits of the valid information VALID of the first page table entries of the page table entry subgroups are set to the first state, a page table entry group is created, the remaining bits except for the selected bit (e.g., the first upper bit) of the valid information VALID of the first page table entry of the first page table entry subgroup of the page table entry group may be changed from the first state to the second state, and the size information SIZE may increase by 1 and thus become 2.

The method of creating the page table entry illustrated in FIG. 4 may end, when the valid information VALID may not be changed any longer.

In the above-described embodiment, each of the page table entry subgroups may include as many page table entries as the number of bits of the valid information VALID, and the page table entry group may include as many page entry subgroups as the number of bits of the valid information VALID. While the operations for creating the page table entry group have been described in the above-described embodiment, a similar operation may be performed to create a page table entry super-group larger than the page table entry group by creating as many page table entry groups as the number of bits of the valid information VALID, change the remaining bits except for a selected bit of the valid information VALID of the first page table entry of the first page table entry group of the page table entry super-group from the first state to the second state, and increase the size information SIZE by 1 to set the size information SIZE to 3.

Figure 5:
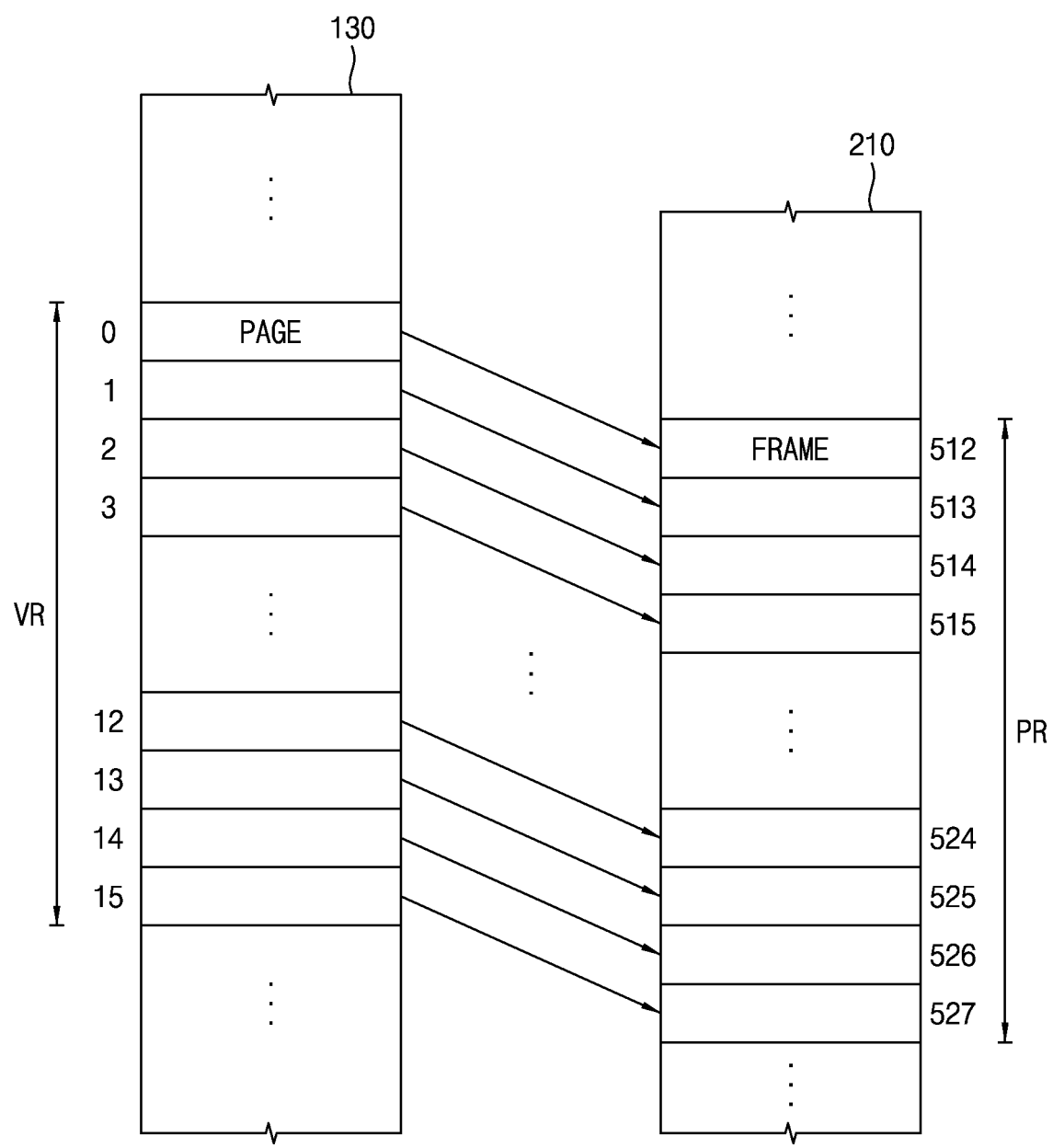
FIG. 5 is a diagram illustrating a mapping relationship between virtual page numbers of a virtual memory and physical frame numbers of the physical memory, for one program, according to an embodiment.

FIG. 5 is a diagram illustrating a mapping relationship between virtual page numbers of a virtual memory and physical frame numbers of a physical memory for one program in reference to FIGS. 1 and 2, according to an embodiment.

Referring to FIG. 5, a program PGM may be stored in 16 virtual pages corresponding to virtual page number 0 to virtual page number 15 in a virtual memory area VR of the virtual memory 130. Further, the program PGM may be stored in physical frames corresponding to physical frame number 512 to physical frame number 527 in a program area PR of the physical memory 210. That is, virtual page number 0 to virtual page number 15 may be mapped to physical frame number 512 to physical frame number 527, respectively.

FIGS. 6A to 6H are diagrams illustrating a process of creating a page table entry, according to an embodiment. FIGS. 6A to 6H illustrate a process of creating a page table by performing operations 400 to 440 illustrated in FIG. 4, when virtual page numbers 0 to 15 are mapped to physical frame numbers 512 to 527 as illustrated in FIG. 5, valid information VALID is 4-bit data, and size information SIZE is 2-bit data.

Figure 6A:
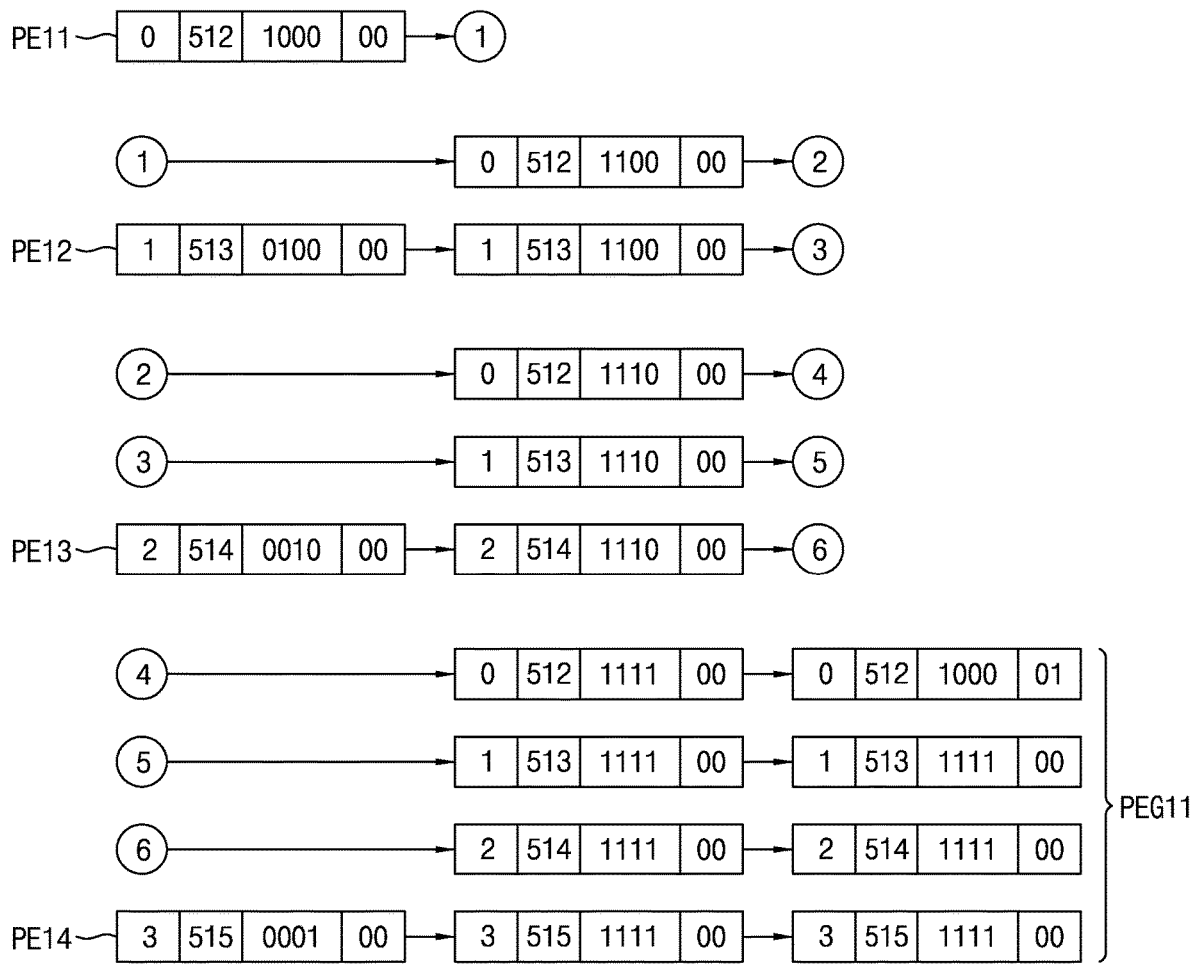
FIGS. 6A to 6H are diagrams illustrating a process of creating a page table entry according to an embodiment.

Referring to FIGS. 4 and 6A, in operation 400, a first page table entry PE11 may be created by assigning 0 to the virtual page number VPN, assigning 512 to the physical frame number PFN, setting a selected bit (e.g., the first upper bit) of the valid information VALID to "1" and setting the remaining bits of the valid information VALID to "0" to create "1000", and assigning "00" to the size information SIZE.

Subsequently, in operation 400, a second page table entry PE12 adjacent to the first page table entry PE11 may be created by assigning 1 to the virtual page number VPN, assigning 513 to the physical frame number PFN, setting a selected bit (e.g., the second upper bit) of the valid information VALID to "1" and setting the remaining bits of the valid information VALID to "0" to create "0100", and setting the size information SIZE to "00".

In operation 410, the valid information VALID of the first page table entry PE11 and the valid information VALID of the second page table entry PE12 are combined (e.g., OR-operated) with each other, so that the valid information VALID of the first page table entry PE11 and the valid information VALID of the second page table entry PE12 are changed to "1100".

In this manner, a third page table entry PE13 and a fourth page table entry PE14 may be created, and the valid information VALID of the first page table entry PE11 to the fourth page table entry PE14 are all combined. Thus, the valid information VALID of the first page table entry PE11 to the fourth page table entry PE14 may all be changed to "1111".

In operation 420, when all of the valid information VALID of the first page table entry PE11 to the valid information VALID of the fourth page table entry PE14 are changed to "1111", a first page table entry subgroup PEG11 may be created. In this case, in the first page table entry PE11 of the first page table entry subgroup PEG1, the valid information VALID may be changed to "1000" by changing the remaining bits except for the selected bit (e.g., the first upper bit) of "1111" in the valid information VALID to "0", and the size information SIZE may be changed to "01" by increasing the size information SIZE by "1".

Figure 6B:
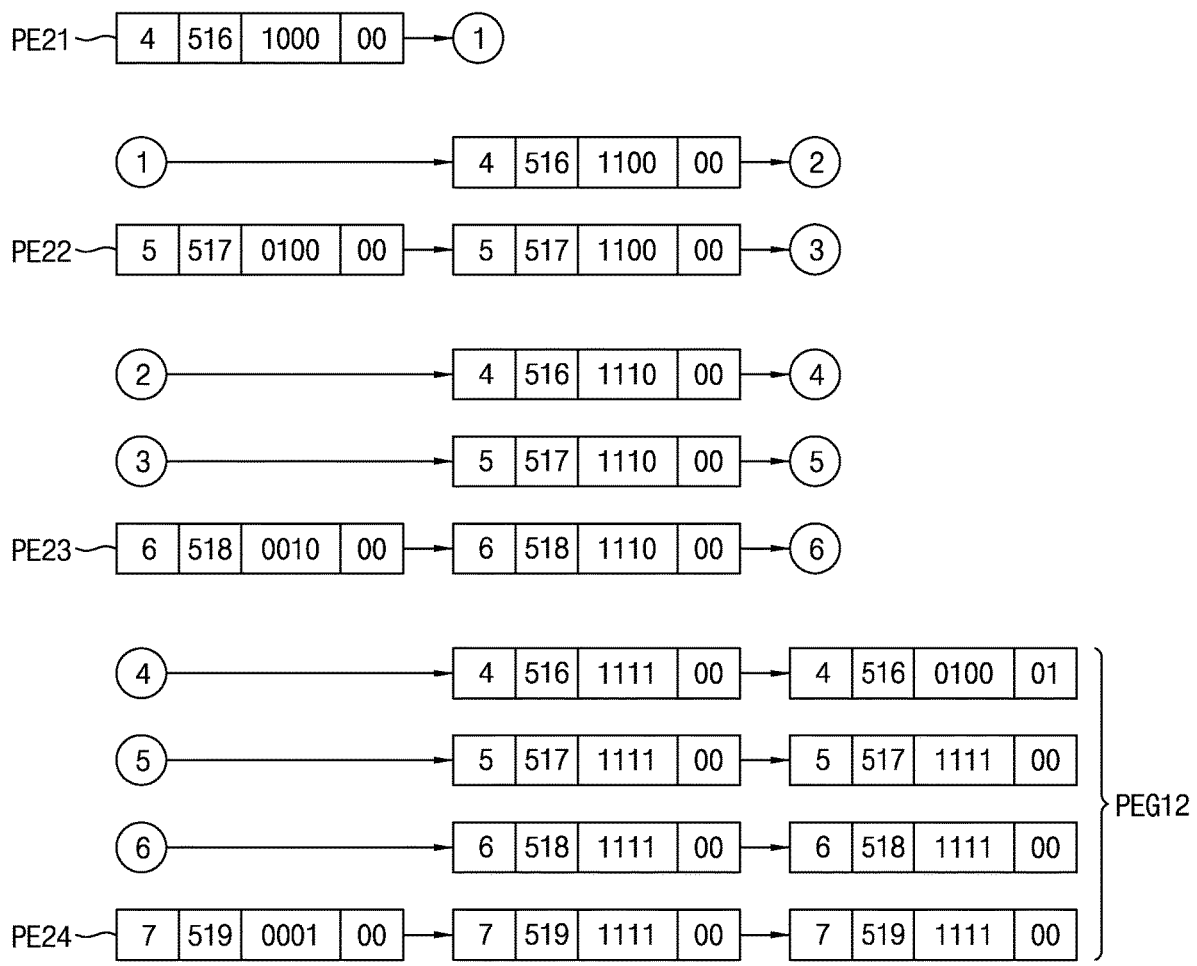

Referring to FIGS. 5 and 6B, a second page table entry subgroup PEG12 including page table entries PE21 to PE24 may be created similarly to the manner described with reference to FIG. 6A. In the first page table entry PE21 of the second page table entry subgroup PEG2, the valid information VALID may be changed to "0100" by setting a selected bit (e.g., the second upper bit) of the valid information VALID to the first state, and the size information SIZE may be changed to "01" by increasing the size information SIZE by "1".

Figure 6C:
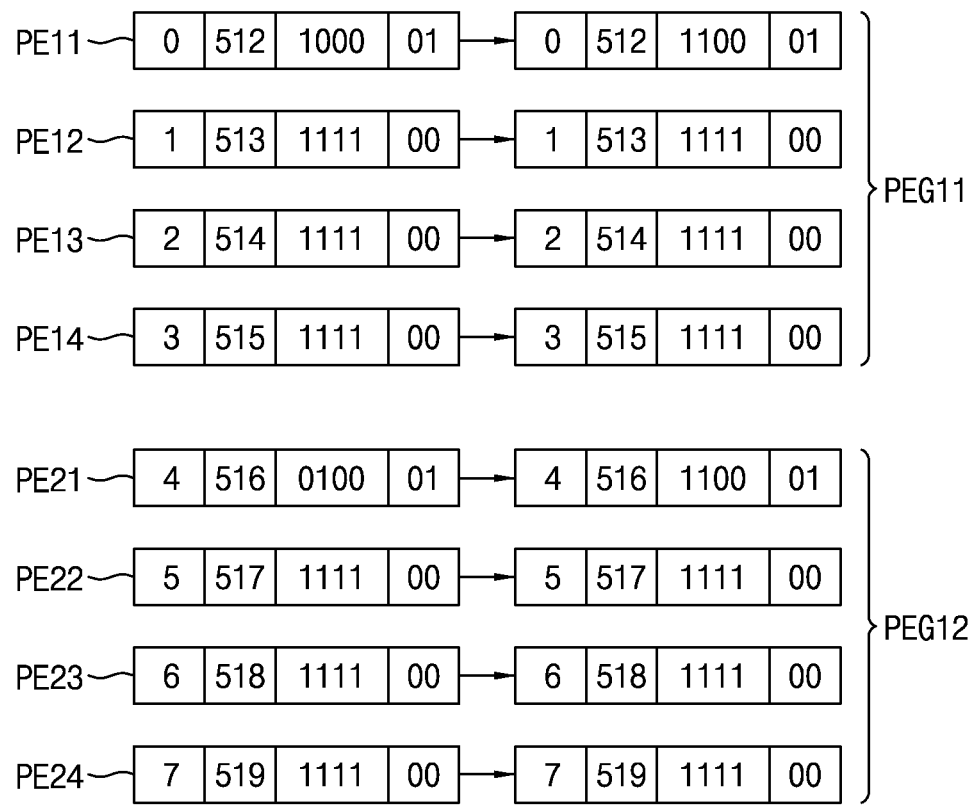

Referring to FIGS. 5 and 6C, In operation 430, the valid information VALID "1000" of the first page table entry PE11 of the first page table entry subgroup PEG11 and the valid information VALID "0100" of the first page table entry PE21 of the second page table entry subgroup PEG12 are combined with each other, so that the valid information VALID of the first page table entries PE11 and PE21 is changed to "1100".

Figure 6D:
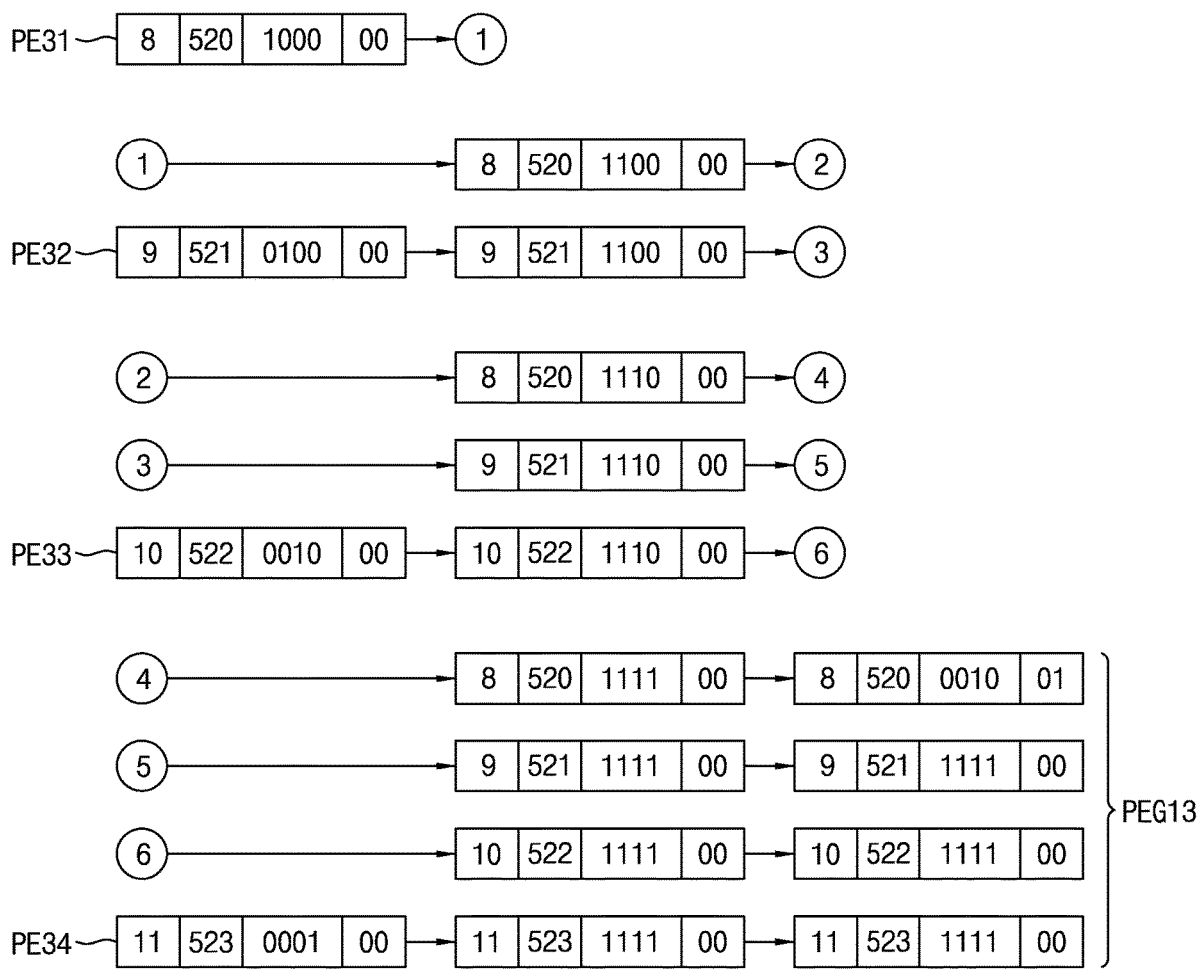

Referring to FIGS. 5 and 6D, a third page table entry subgroup PEG13 including page table entries PE31 to PE34 may be created similarly to the manner described with reference to FIG. 6A. In the first page table entry PE31 of the third page table entry subgroup PEG13, the valid information VALID may be changed to "0010" by setting a selected bit (e.g., the third upper bit) in the valid information VALID to the first state, and the size information SIZE may increase by "1" to become "01".

Figure 6E:
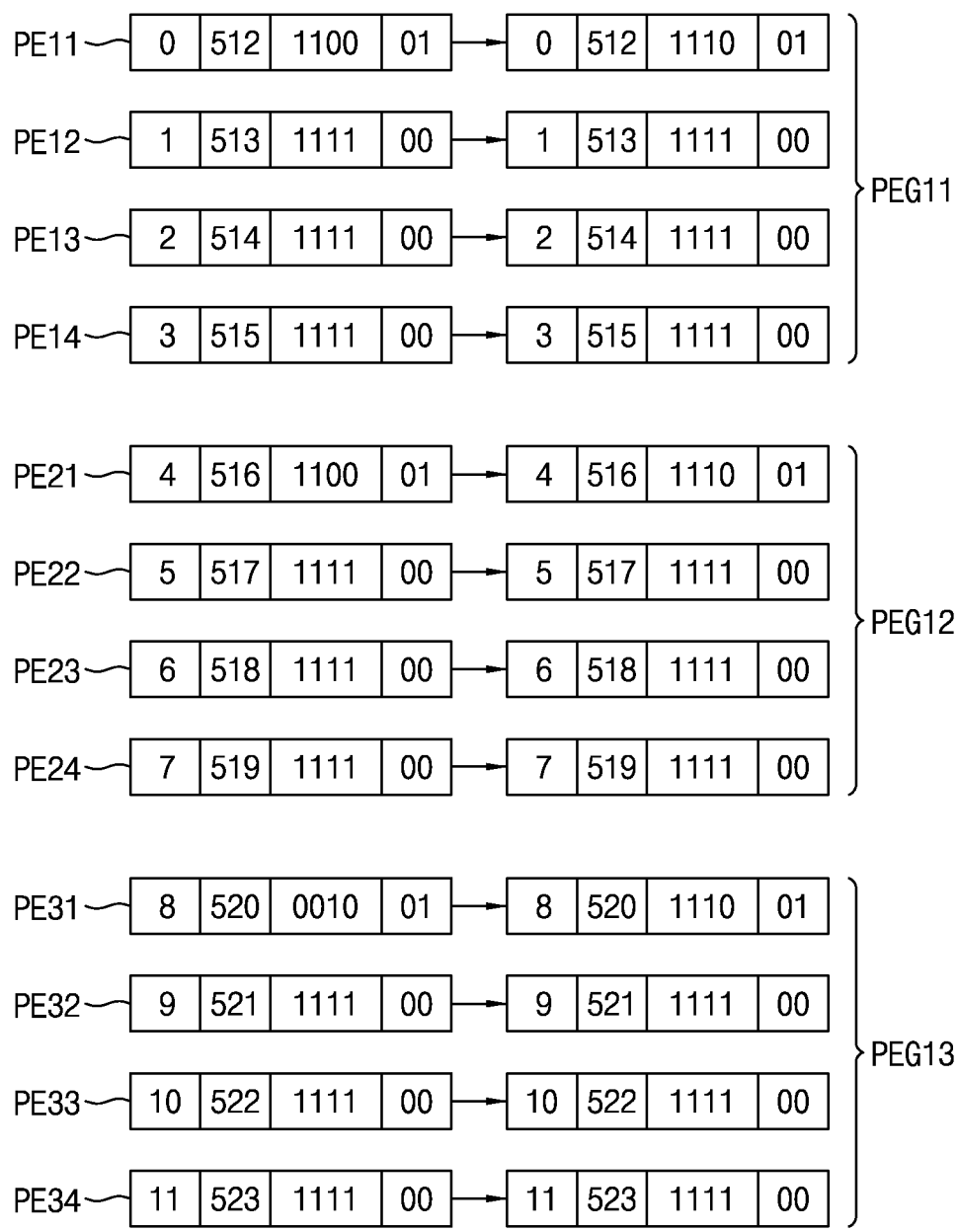

Referring to FIGS. 5 and 6E, in operation 430, the valid information VALID "1100" of the first page table entry PE11 of the first page table entry subgroup PEG11, the valid information VALID "1100" of the first page table entry PE21 of the second page table entry subgroup PEG12, and the valid information VALID "0010" of the first page table entry PE31 of the third page table entry subgroup PEG13 are combined with one another, so that the valid information VALID of the first page table entries PE11, PE21, and PE31 of the first page table entry subgroup PEG11 to the third page table entry subgroup PEG13 are changed to "1110".

Figure 6F:
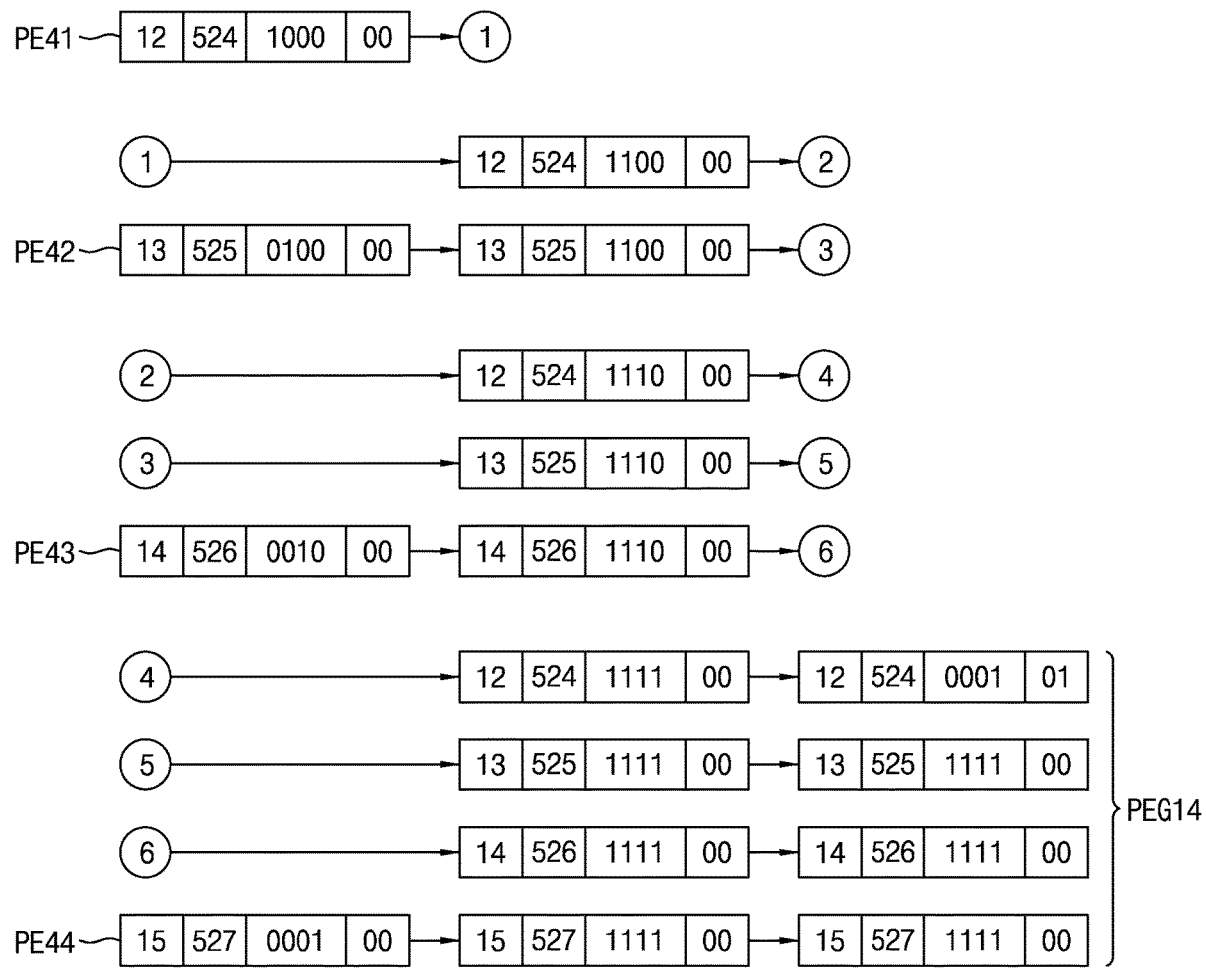

Referring to FIGS. 5 and 6F, a fourth page table entry subgroup PEG14 including page table entries PE41 to PE44 may be created similarly to the manner described with reference to FIG. 6A. In the first page table entry PE41 of the fourth page table entry subgroup PEG14, the valid information VALID may be changed to "0001" by setting a selected bit (e.g., the lowest bit) in the valid information VALID to the first state, and the size information SIZE may increase by "1" to become "01".

Figure 6G:
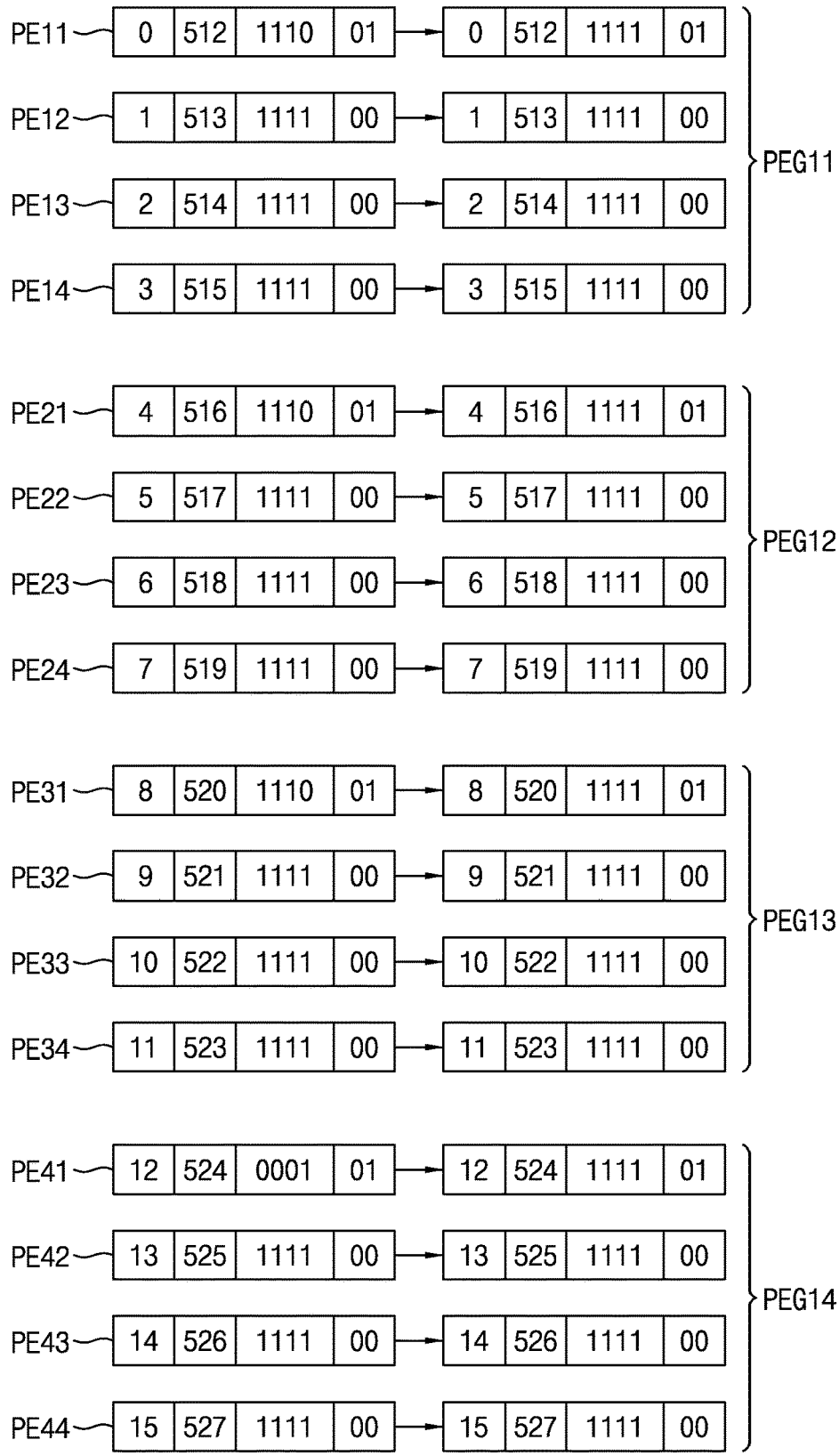

Referring to FIGS. 5 and 6G, in operation 430, the valid information VALID "1110" of the first page table entry PE11 of the first page table entry subgroup PEG11, the valid information VALID "1110" of the first page table entry PE21 of the second page table entry subgroup PEG12, the valid information VALID "1110" of the first page table entry PE31 of the third page table entry subgroup PEG13, and the valid information VALID "0001" of the first page table entry PE41 of the fourth page table entry subgroup PEG14 are combined with each other, so that the valid information VALID of the first page table entries PE11, PE21, PE31, and PE41 of the first page table entry subgroup PEG11 to the fourth page table entry subgroup PEG14 are changed to "1111".

Figure 6H:
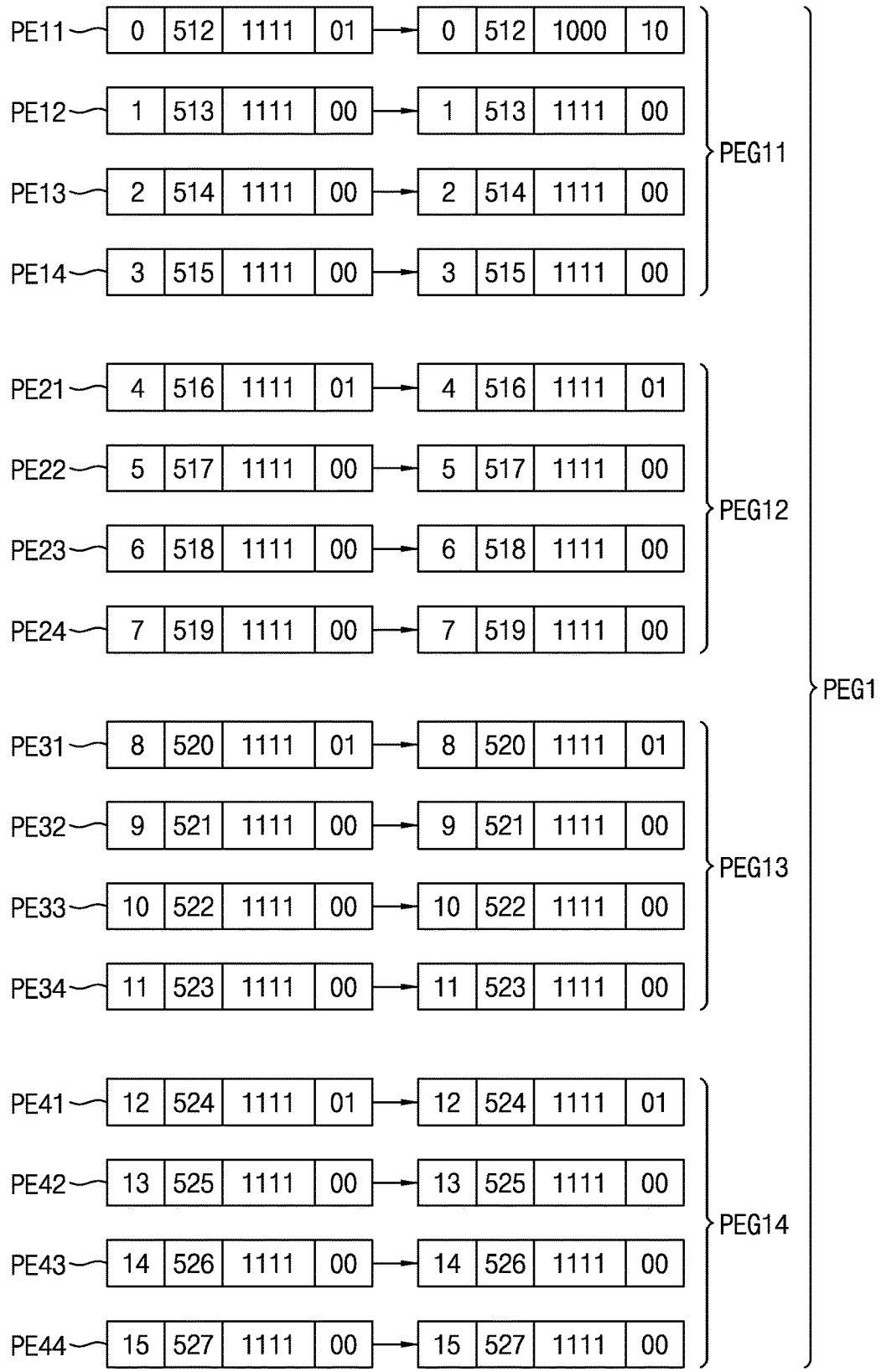

Referring to FIGS. 5 and 6H, in operation 440, when all bits of the valid information VALID of the first page table entries PE11, PE21, PE31, and PE41 of the first page table entry subgroup PEG11 to the fourth page table entry subgroup PEG14 are changed to "1111", a page table entry group PEG1 is created. In the first page table entry PE11 of the first page table entry subgroup PEG11, the valid information VALID may be changed to "1000" by changing the remaining bits except for the selected bit (e.g., the first upper bit) of the valid information VALID from "1" to "0", and the size information SIZE may increase by 1 to become "10".

FIG. 7 is a flowchart illustrating a method of creating a page table entry by a controller, according to an embodiment. In FIG. 7, a method of increasing size information SIZE and determining whether to maintain the size information SIZE in operation 420 of FIG. 4 is described.

Referring to FIG. 7, when the size information SIZE increases in operation 420 or 440 of FIG. 4, in operation 700, a base physical frame number BPFN is calculated by setting lower M bits of a physical frame number PFN to "0". The lower M bits may be calculated by the following Equation 1.

$$M=\log_2(\text{the number of bits of valid information VALID})\times(\text{size information SIZE}+1) \quad (1)$$

In operation 710, the base physical frame number BPFN is compared with the physical frame number PFN. When the base physical frame number BPFN is the same as the physical frame number PFN, the procedure goes to operation 720, and otherwise, the procedure goes to operation 730.

In operation 720, the increased size information SIZE is maintained.

In operation 730, the increased size information SIZE decreases by 1, and the valid information VALID is changed to the previous value.

Figure 8A:
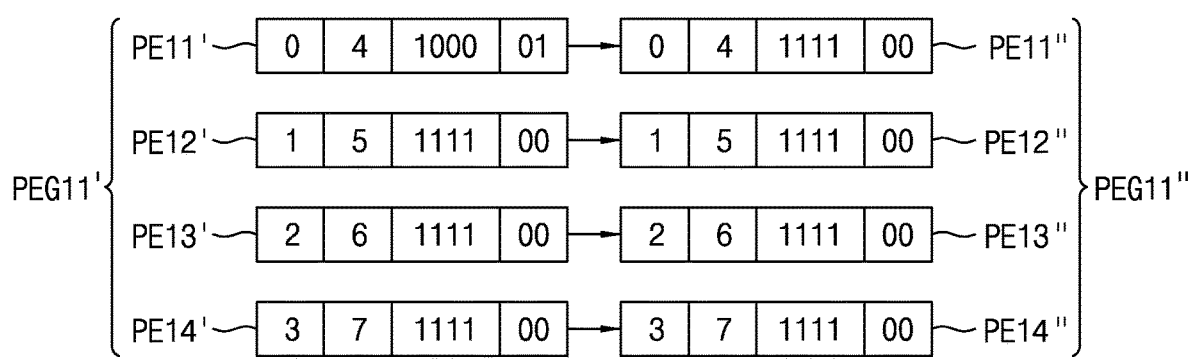
FIGS. 8A and 8B are flowcharts illustrating a process of creating a page table entry in a controller according to an embodiment.
Figure 8B:
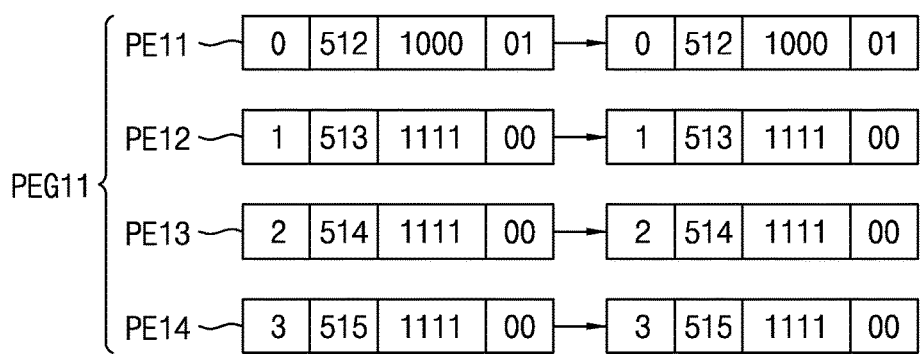

FIGS. 8A and 8B are flowcharts illustrating a process of creating a page table entry in a controller, according to an embodiment. In FIGS. 8A and 8B, a process of creating a page table entry by performing the operations of FIG. 7 is illustrated.

Referring to FIGS. 4, 7, and 8A, when virtual page numbers VPN 0 to VPN 3 are mapped to physical frame numbers PFN 4 to PFN 7, respectively, a page table entry subgroup PEG11' including page table entries PE11' to PE14' may be created by performing the operations of FIG. 4.

Referring to FIGS. 7 and 8A, in operation 700, when M is calculated to be 4 by $M(=\log_2 4\times(1+1))$ and lower 4 bits of the physical frame number PFN 4(="0100") is set to "0", the base physical frame number BPFN may become "0000".

In operation 710, when the base physical frame number BPFN "0000" is not the same as the physical frame number PFN "0100" of the first page table entry PE11', the procedure may go to operation 730.

In operation 730, a page table entry PE11" may be created by changing the size information SIZE of the first page table entry PE11' to 0 (="00") by decreasing the size information SIZE by 1 and changing the valid information VALID to the previous value "1111".

As a consequence, the page table entry subgroup PEG11" including the page table entries PE11", PE12", PE13", and PE14" may be created.

Referring to FIGS. 4, 7, and 8B, when virtual page numbers VPN 0 to VPN 3 are mapped to physical frame numbers PFN 512 to PFN 515, respectively, a page table entry subgroup PEG11 including page table entries PE11 to PE14 may be created by performing the operations of FIG. 4.

Referring to FIGS. 7 and 8B, in operation 700, when M is calculated to be 4 by M(=log$_2$4×(1+1)) and the lower 4 bits of the physical frame number PFN 512 (="1000000000") of the first page table entry PE11 are set to "0", the base physical frame number BPFN may become 512 (="1000000000").

In operation 710, when the base physical frame number BPFN 512 ("1000000000") is the same as the physical frame number PFN 512 ("1000000000") of the first page table entry PE11, the procedure may go to operation 720.

In operation 720, the size information SIZE 1 (="01") of the page table entry PE11 may be maintained.

As a consequence, the page table entry subgroup PEG11 including the page table entries PE11, PE12, PE13, and PE14 is maintained.

Figure 9:
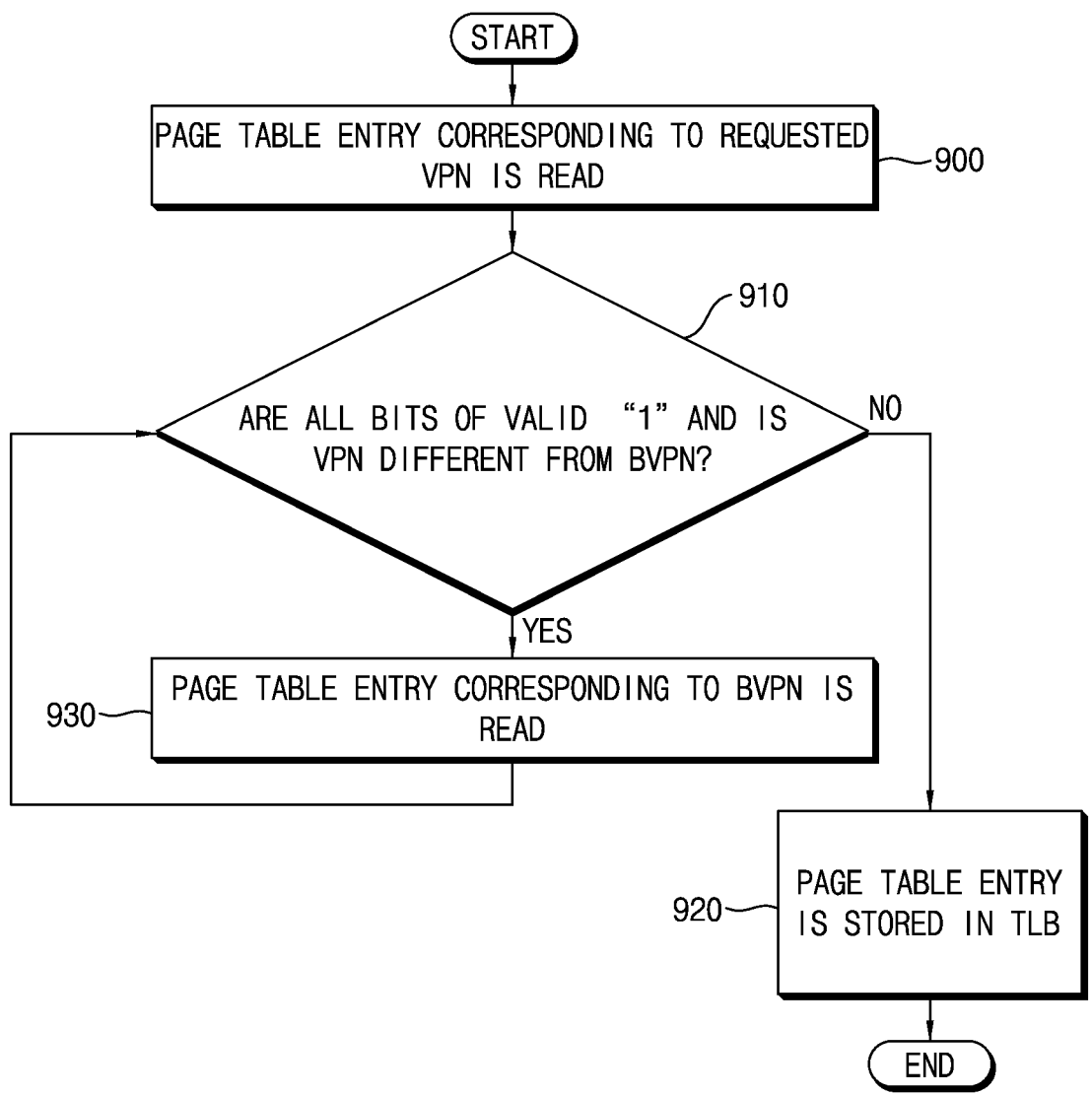
FIG. 9 is a flowchart illustrating a method of searching a page table entry included in a page table in a main memory by a controller, according to an embodiment.

FIG. 9 is a flowchart illustrating a method of searching a page table entry included in a page table in a main memory by a controller, according to an embodiment. As the controller 100 searches the TLB 122 shown in FIG. 1, and determines the absence of mapping information corresponding to a requested virtual page number VPN, the controller 100 searches a first page table entry of a table entry subgroup (or group) including a page table entry for the requested virtual page number VPN in a page table of the physical memory 210 in the main memory 200 in the method of FIG. 9.

Referring to FIG. 9, in operation 900, a page table entry corresponding to a requested virtual page number VPN is read from a page table in the main memory 200.

In operation 910, it is determined whether all bits of valid information VALID of the page table entry is "1" and a virtual page number VPN of the page table entry is different from a base virtual page number BVPN. When this condition is not satisfied, the procedure goes to operation 920, and when this condition is satisfied, the procedure goes to operation 930. The base virtual page number BVPN may be obtained by calculating N by the following Equation 2, and then, changing lower N bits of the virtual page number VPN to "0".

$$N = \log_2(\text{the number of bits in valid information VALID}) \times (\text{size information SIZE} + 1) \quad (2)$$

In operation 920, the page table entry is determined to be the first page table entry of a page table entry subgroup (or group) and stored in the TLB 122.

In operation 930, a page table entry corresponding to the base virtual page number BVPN is read from the page table of the physical memory 210 in the main memory 200. Then, the procedure goes to operation 910.

For example, when a page table is configured with page table entry subgroups PEG11 and PEG12 as illustrated in FIG. 6C and the requested virtual page number VPN is 6, the control device 100 searches a page table entry in the following method.

Referring to FIGS. 6C and 9, the page table entry PE23 corresponding to the virtual page number VPN 6 is read in operation 900.

In operation 910, when all bits of the valid information VALID in the page table entry PE23 are "1" and the virtual page number VPN 6 of the page table entry PE23 is different from the base virtual page number BVPN 4, the procedure goes to operation 930.

Specifically, in operation 910, N is calculated to be 2 by N(=log$_2$4×(0+1)), and the lower two (2) bits of the virtual page number VPN 6 (="0110") of the page table entry PE23 are changed to "0". Thus, the base virtual page number BVPN "0100", that is, 4 may be obtained.

In operation 930, the page table entry PE21 corresponding to the base virtual page number BVPN 4 is read.

In operation 910, when all bits of the valid information VALID in the page table entry PE21 are not "1" and the virtual page number VPN 4 of the page table entry PE21 is not the same as the base virtual page number BVPN 0, the procedure goes to operation 920. The page table entry PE21 is stored in the TLB 122 in operation 920.

Specifically, in operation 910, N is calculated to be 2 by N(=log$_2$4×(0+1)), and the lower two (2) bits of the virtual page number VPN 4 (="0100") of the page table entry PE21 are changed to "0". Thus, a base virtual page number BVPN "0000", that is, 0 may be obtained.

In another example, when a page table is configured with the page table entry group PEG1 as illustrated in FIG. 6H and the requested virtual page number VPN is 14, the control device 100 searches a page table entry in the following method.

Referring to FIGS. 6H and 9, a page table entry PE43 corresponding to the virtual page number VPN 14 is read in operation 900.

In operation 910, when all bits of the valid information VALID in the page table entry PE43 are "1" and the virtual page number VPN 14 of the page table entry PE43 is different from a base virtual page number BVPN 12, the procedure goes to operation 930.

Specifically, in operation 910, N is calculated to be 2 by N(=log$_2$4×(0+1)), and the lower two (2) bits of the virtual page number VPN 14 (="1110") to "0". Thus, the base virtual page number BVPN "1100", that is, 12 may be obtained.

In operation 930, a page table entry PE41 corresponding to the base virtual page number BVPN 12 is read, and then the procedure goes to operation 910.

In operation 910, when all bits of the valid information VALID in the page table entry PE41 are "1" and the virtual page number VPN 12 of the page table entry PE41 is different from the base virtual page number BVPN 0, the procedure goes to operation 930.

Specifically, in operation 910, N is calculated to be 4 by N(=log$_2$4×(1+1)), and the lower four (4) bits of the virtual page number VPN 12 (="1100") are changed to "0". Thus, a base virtual page number BVPN "0000", that is, 0 may be obtained.

In operation 930, the page table entry PE11 corresponding to the base virtual page number BVPN 0 is read.

In operation 910, when all bits of the valid information VALID in the page table entry PE11 are not "1" and the virtual page number VPN 0 of the page table entry PE11 is the same as the base virtual page number BVPN 0, the procedure goes to operation 920. The page table entry PE11 is stored in the TLB 122.

Specifically, in operation 910, N is calculated to be 6 by N(=log$_2$4×(2+1)), and the lower six (6) bits of the virtual page number VPN 0 (="0000") of the page table entry PE11 are changed to "0". Thus, the base virtual page number BVPN "0000", that is, 0 may be obtained.

Figure 10:
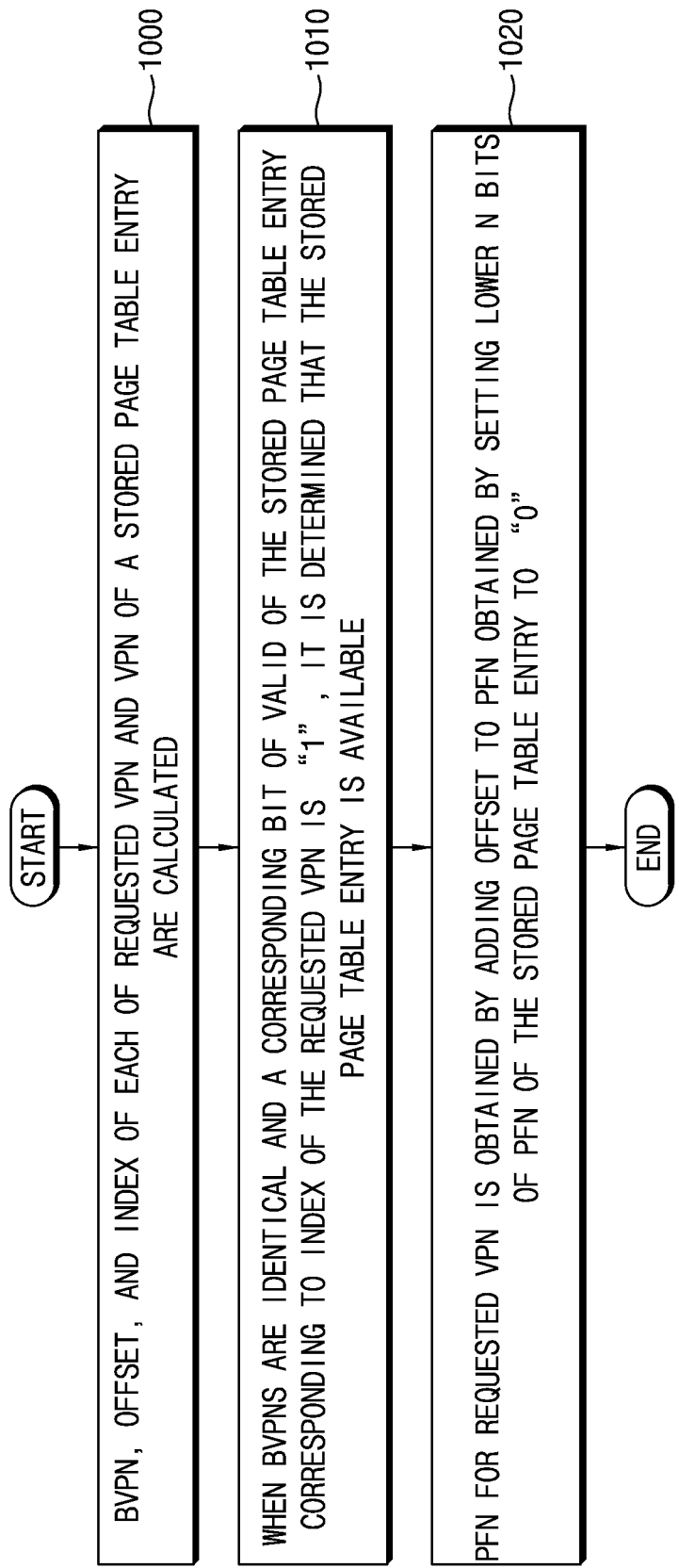
FIG. 10 is a flowchart illustrating a method of searching a page table entry stored in a TLB by a controller according to an embodiment.

FIG. 10 is a flowchart illustrating a method of searching a page table entry stored in a TLB by a controller, according to an embodiment. A physical frame number corresponding to a virtual page number is obtained by using a stored page table entry in the method of FIG. 10.

In operation 1000, a base virtual page number BVPN, an offset OFFSET, and an index INDEX for each of a requested virtual page number VPN and the virtual page number VPN of a page table entry stored in the TLB 122 are obtained.

The base virtual page number BVPN is obtained by calculating N by Equation 2 and changing the lower N bits of the virtual page number VPN to "0". When N is calculated, the size information SIZE of the stored page table entry is used as the size information SIZE of the requested virtual page number VPN.

The offset OFFSET is a value before changing to "0" to obtain the base virtual page number BVPN, the index INDEX is the value of the upper K bits of the offset OFFSET, and K=$\log_2$(the number of bits in valid information VALID).

In operation 1010, when the base virtual page number BVPN of the requested virtual page number VPN is the same as the base virtual page number BVPN of the virtual page number VPN of the stored page table entry, and a bit of the valid information VALID of the stored page table entry corresponding to the index INDEX of the requested virtual page number VPN is "1", it is determined that the stored page table entry is available for use to obtain a physical frame number PFN of the requested virtual page number VPN.

In operation 1020, the offset OFFSET is added to a value obtained by setting the lower N bits of the physical frame number PFN of the stored page table entry to "0" to obtain the physical frame number PFN for the requested virtual page number VPN.

For example, when the first page table entry PE21 of the page table entry subgroup PEG12 illustrated in FIG. 6C is stored in the TLB 122, and the requested virtual page number VPN is 7, the controller 100 searches a physical frame number PFN corresponding to a virtual page number VPN 7 by using the page table entry PE21 in the following method.

Referring to FIGS. 6C and 10, in operation 1000, a base virtual page number BVPN, an offset OFFSET, and an index INDEX for the requested virtual page number VPN 7 are calculated.

The base virtual page number BVPN for the virtual page number VPN 7 is a value obtained by changing the lower N bits of the virtual page number VPN 7 (="0111") to "0". Because N is 4 (=$\log_2$4×(1+1), where the size information SIZE of the stored page table entry PE21 is "01"), the base virtual page number BVPN may be 0 (="0000").

The offset OFFSET for the virtual page number VPN 7 is a value before changing to "0" to obtain the base virtual page number BVPN. Thus, the offset OFFSET may be "0111".

The index INDEX is a value obtained by taking the upper K bits of the offset OFFSET. Since K is 2, the index INDEX may be "01".

Further, a base virtual page number BVPN, an offset OFFSET, and an index INDEX for the virtual page number VPN 4 stored in the page table entry PE21 are calculated.

The base virtual page number BVPN for the virtual page number VPN 4 is a value obtained by changing the lower N bits of the virtual page number VPN 4 (="0100") to "0". Because N is 4 (=$\log_2$4×(1+1)), the base virtual page number BVPN may be 0 (="0000").

The offset OFFSET for the virtual page number VPN 4 is a value before changing to "0" to obtain the base virtual page number BVPN. Thus, the offset OFFSET may be "0100".

The index INDEX is a value obtained by taking the upper K bits of the offset OFFSET. Since K is 2, the index INDEX may be "01".

In operation 1010, the base virtual page number BVPN "0000" for the virtual page number VPN 7 is the same as the base virtual page number BVPN "0000" for the virtual page number VPN 4, the valid information VALID of the page table entry PE21 is "1100", the index INDEX for the virtual page number VPN 7 is 1 (="01"), and a bit of the valid information VALID of the page table entry PE21 corresponding to the index INDEX of the virtual page number VPN 7 (that is, the second upper bit in "1100" since the index value INDEX is 1) is "1". Therefore, the controller 100 may determine that it may search the physical frame number PFN for the virtual page number VPN 7 by using the page table entry PE21.

In operation 1020, the base physical frame number BPFN is obtained by changing the lower M bits of the physical frame number PFN 516 (="1000000100") of the page table entry PE21 to "0". Since M is 4, the lower 4 bits of the physical frame number PFN 516 (="1000000100") are changed to "0" to obtain a base physical frame number BPFN 512 (="1000000000"). Then, a physical frame number PFN 519 is obtained by adding the offset OFFSET 7 (="0111") to the base physical frame number BPFN 512 (=10000000000).

As is apparent from the foregoing description, according to embodiments, the size information of a page table entry may vary according to the data size of a program. Further, since the number of bits in the valid information of the page table entry and the number of bits in the size information of the page table entry may vary, the disclosure is applicable to various types of controllers (e.g., a central processing unit (CPU), a graphical processing unit (GPU), a numeric processing unit (NPU), and an accelerator).

Further, according to embodiments, once the first page table entry of a page table entry subgroup or group stored in the physical memory of the main memory 200 is stored in the TLB 122, physical frame numbers may be obtained for the virtual page numbers of the remaining page table entries of the stored page table entry subgroup or group without searching a page table stored in the physical memory of the main memory 200.

Accordingly, the address translation performance of the controller and the computing system 500 including the controller 100 may be improved.

While the disclosure has been particularly shown and described with reference to example embodiments thereof, it will be apparent to those skilled in the art that various changes in form and detail may be made without departing from the spirit and essential characteristics of the disclosure. The above embodiments are therefore to be construed in all aspects as illustrative and not restrictive.

What is claimed is:
1. A controller comprising:
a processor configured to create a page table comprising page table entries comprising mapping information for translating a virtual address to a physical address,
wherein each of the page table entries comprises a virtual page number, a physical frame number, valid information, and size information,
wherein the virtual address comprises the virtual page number,

13 wherein the physical address comprises the physical frame number, wherein the valid information comprises a first predetermined number of bits, wherein the size information comprises a second predetermined number of bits, wherein the first predetermined number of bits of the valid information represents an address translation range in a page table entry or a number of page table entries to be grouped, wherein the size information represents a size indicated by each bit of the first predetermined number of bits of the valid information, wherein the processor is configured to create the page table entry by mapping the virtual page number to the physical frame number, setting a selected bit of the first predetermined number of bits of the valid information to a first state, and setting the second predetermined number of bits of the size information to an initial value, and wherein the controller is configured to combine the valid information in the created page table entry with valid information in at least one previously created page table entry.

2. The controller according to claim 1, wherein when all of the first predetermined number of bits in the valid information in the created page table entries are set to the first state, the controller is configured to create a page table entry subgroup, change remaining bits except for the selected bit of the first predetermined number of bits in the valid information in a first page table entry of the page table entry subgroup from the first state to a second state, and increase the size information in the first page table entry of the page table entry subgroup.

3. The controller according to claim 2, wherein each time a page table entry subgroup is created, the controller is configured to combine the valid information in the first page table entry of the created page table entry subgroup with the valid information in the first page table entry of at least one previously created page table entry subgroup, and wherein when all of the first predetermined number of bits in the valid information in the first page table entries of the page table entry subgroups are set to the first state, the controller is configured to create a page table entry group, change remaining bits except for the selected bit of the first predetermined number of bits in the valid information in the first page table entry of the page table entry subgroup of the page table entry group from the first state to the second state, and increase the size information in the first page table entry of the page table entry subgroup of the page table entry group.

4. The controller according to claim 3, wherein when the size information in the first page table entry increases, the controller is configured to calculate a base physical frame number by changing lower M bits of the physical frame number in the first page table entry to the second state, wherein when the physical frame number in the first page table entry is the same as the base physical frame number, the controller is configured to maintain the increased size information, and when the physical frame number of the first page table entry is not the same as the base physical frame number, the controller is configured to decrease the increased size information and change the valid information in the first page table entry to a previous value, and

14 wherein M is ($\log_2$(a number of bits in the valid information in the first page table entry)×(the increased size information+1)).

5. The controller according to claim 3, wherein the controller further comprises a translation lookaside buffer (TLB) configured to store a part of the page table entries, and wherein when a page table entry corresponding to a requested virtual page number is absent in the TLB, and a first page table entry of a page table entry subgroup or group comprising the page table entry corresponding to the requested virtual page number is stored in the TLB, the controller is configured to calculate a base virtual page number, an offset, and an index of each of the requested virtual page number and the virtual page number of the stored first page table entry, wherein when the base virtual page number of the requested virtual page number is the same as the base virtual page number of the stored virtual page number, and a bit of the valid information in the stored first page table entry corresponding to the index of the requested virtual page number is in the first state, the controller is configured to determine that the stored first page table entry is available for use to obtain a physical frame number corresponding to the requested virtual page number, wherein the controller is configured to calculate the physical frame number corresponding to the requested virtual page number by adding the offset of the requested virtual page number to a base physical frame number of a physical frame number of the stored page table entry, wherein the controller is configured to calculate the base virtual page number of the requested virtual page number by changing lower N1 bits of the requested virtual page number to the second state, the offset of the requested virtual page number being a value before being changed to the second state to calculate the base virtual page number of the requested virtual page number, and the index of the requested virtual page number being upper K1 bits of the offset of the requested virtual page number, N1 being $\log_2$(a number of bits in the valid information in the page table entry corresponding to the requested virtual page number)× (the size information in the stored first page table entry+1)), and K1 being $\log_2$(the number of bits in the valid information in the page table entry corresponding to the requested virtual page number), wherein the controller is configured to calculate the base virtual page number of the stored virtual page number by changing lower N2 bits of the stored virtual page number to the second state, the offset of the stored virtual page number being a value before being changed to the second state to calculate the base virtual page number of the stored virtual page number, and the index of the stored virtual page number being upper K2 bits of the offset of the stored virtual page number, N2 being $\log_2$(a number of bits in the valid information in the stored first page table entry)×(the size information in the stored first page entry+1)), and K2 being $\log_2$(the number of bits in the valid information in the stored first page table entry).

6. A computing system comprising:

a controller configured to create a page table comprising page table entries comprising mapping information for translating a virtual address to a physical address, and store a part of the page table entries; and a main memory comprising a physical memory, and configured to store the page table in the physical memory, wherein each of the page table entries comprises a virtual page number, a physical frame number, valid information, and size information, wherein the virtual address comprises the virtual page number, wherein the physical address comprises the physical frame number, wherein the valid information comprises a first predetermined number of bits, wherein the size information comprises a second predetermined number of bits, wherein the first predetermined number of bits of the valid information represents an address translation range in a page table entry or a number of page table entries to be grouped, wherein the size information represents a size indicated by each bit of the first predetermined number of bits of the valid information, wherein the controller is configured to create the page table entry of the page table entries by mapping the virtual page number to the physical frame number, set a selected bit of the first predetermined number of bits of the valid information to a first state, and set the second predetermined number of bits of the size information to an initial state, and wherein the controller is configured to combine the valid information in the created page table entry with valid information in at least one previously created page table entry.

7. The computing system according to claim 6, wherein when all of the first predetermined number of bits in the valid information in the created page table entries are set to the first state, the controller is configured to create a page table entry subgroup, change remaining bits except for the selected bit of the first predetermined number of bits in the valid information in a first page table entry of the page table entry subgroup from the first state to a second state, and increase the size information in the first page table entry of the page table entry subgroup.

8. The computing system according to claim 7, wherein each time a page table entry subgroup is created, the controller is configured to combine the valid information in the first page table entry of the created page table entry subgroup with the valid information in the first page table entry of at least one previously created page table entry subgroup, and wherein when all of the first predetermined number of bits in the valid information in the first page table entries of the page table entry subgroups are set to the first state, the controller is configured to create a page table entry group, change remaining bits except for the selected bit of the first predetermined number of bits in the valid information in the first page table entry of the page table entry subgroup of the page table entry group from the first state to the second state, and increase the size information in the first page table entry of the page table entry subgroup of the page table entry group.

9. The computing system according to claim 8, wherein when the size information in the first page table entry increases, the controller is configured to calculate a base physical frame number by changing lower M bits of the physical frame number in the first page table entry to the second state, wherein when the physical frame number in the first page table entry is the same as the base physical frame number, the controller is configured to maintain the increased size information, and when the physical frame number of the first page table entry is not the same as the base physical frame number, the controller is configured to decrease the increased size information and change the valid information in the first page table entry to a previous value, and wherein M is ($\log_2$(a number of bits in the valid information in the first page table entry)×(the increased size information+1)).

10. The computing system according to claim 8, wherein the controller further comprises a translation lookaside buffer (TLB) configured to store a part of the page table entries, and wherein when a page table entry corresponding to a requested virtual page number is absent in the TLB, the controller is configured to read a first page table entry of a page table entry subgroup or group comprising the page table entry corresponding to the requested virtual page number from the page table in the main memory and store the read first page table entry in the TLB.

11. The computing system according to claim 10, wherein the controller is configured to determine whether a condition that all of the first predetermined number of bits in the valid information of the page table entry corresponding to the requested virtual page number are set to the first state, and the requested virtual page number is different from a base virtual page number obtained by changing lower N bits of the requested virtual page number to the second state is satisfied, store the page table entry corresponding to the requested virtual page number in the TLB, when the condition is not satisfied, and read a page table entry corresponding to the base virtual page number, when the condition is satisfied, and wherein N is $\log_2$(a number of bits in the valid information in the page table entry corresponding to the requested virtual page number)×(the size information in the page table entry corresponding to the requested virtual page number+1).

12. The computing system according to claim 8, wherein the controller further comprises a translation lookaside buffer (TLB) configured to store a part of the page table entries, and wherein when a page table entry corresponding to a requested virtual page number is absent in the TLB, and a first page table entry of a page table entry subgroup or group comprising the page table entry corresponding to the requested virtual page number is stored in the TLB, the controller is configured to calculate a base virtual page number, an offset, and an index of each of the requested virtual page number and the virtual page number of the stored first page table entry, wherein when the base virtual page number of the requested virtual page number is the same as the base virtual page number of the stored virtual page number, and a bit of the valid information in the stored first page table entry corresponding to the index of the requested virtual page number is in the first state, the controller is configured to determine that the stored first page table entry is available for use to obtain a physical frame number corresponding to the requested virtual page number, wherein the controller is configured to calculate the physical frame number corresponding to the requested virtual page number by adding the offset of the requested virtual page number to a base physical frame number of a physical frame number of the stored page table entry, wherein the controller is configured to calculate the base virtual page number of the requested virtual page number by changing lower N1 bits of the requested virtual page number to the second state, the offset of the requested virtual page number being a value before being changed to the second state to calculate the base virtual page number of the requested virtual page number, and the index of the requested virtual page number being upper K1 bits of the offset of the requested virtual page number, N1 being $\log_2$(a number of bits in the valid information in the page table entry corresponding to the requested virtual page number)× (the size information in the stored first page table entry+1)), and K1 being $\log_2$(the number of bits in the valid information in the page table entry corresponding to the requested virtual page number), wherein the controller is configured to calculate the base virtual page number of the stored virtual page number by changing lower N2 bits of the stored virtual page number to the second state, the offset of the stored virtual page number being a value before being changed to the second state to calculate the base virtual page number of the stored virtual page number, and the index of the stored virtual page number being upper K2 bits of the offset of the stored virtual page number, N2 being $\log_2$(a number of bits in the valid information in the stored first page table entry)×(the size information in the stored first page entry+1)), and K2 being $\log_2$(the number of bits in the valid information in the stored first page table entry).

13. A method of creating and searching a page table entry in a computing system including a controller configured to create a page table comprising page table entries comprising mapping information for translating a virtual address to a physical address, and store a part of the page table entries, and a main memory comprising a physical memory and configured to store the page table in the physical memory, the method comprising:

creating a page table entry comprising a virtual page number, a physical frame number, valid information, and size information, wherein the virtual address comprises the virtual page number, wherein the physical address comprises the physical frame number, wherein the valid information comprises a first predetermined number of bits of the valid information, wherein the size information comprises a second predetermined number of bits, and wherein the first predetermined number of bits of the valid information represents an address translation range in a page table entry or a number of page table entries to be grouped, and wherein the size information represents a size indicated by each bit of the first predetermined number of bits, wherein the creating the page table entry comprises:

creating the page table entry by mapping the virtual page number to the physical frame number, setting a selected bit of the first predetermined number of bits of the valid information to a first state, and setting the second predetermined number of bits of the size information to an initial value; and combining the valid information in the created page table entry with valid information in at least one previously created page table entry.

14. The method according to claim 13, wherein the creating the page table entry comprises:

when all of the first predetermined number of bits in the valid information in the created page table entries are set to the first state, creating a page table entry subgroup, change remaining bits except for the selected bit of the first predetermined number of bits in the valid information in a first page table entry of the page table entry subgroup from the first state to a second state, and increasing the size information in the first page table entry of the page table entry subgroup.

15. The method according to claim 14, wherein the creating the page table entry further comprises:

each time a page table entry subgroup is created, combining the valid information in the first page table entry of the created page table entry subgroup with the valid information in the first page table entry of at least one previously created page table entry subgroup; and when all of the first predetermined number of bits in the valid information of the first page table entries of the page table entry subgroups are set to the first state, creating a page table entry group, change remaining bits except for the selected bit of the first predetermined number of bits in the valid information in the first page table entry of the page table entry subgroup of the page table entry group from the first state to the second state, and increasing the size information in the first page table entry of the page table entry subgroup of the page table entry group.

16. The method according to claim 15, wherein the creating the page table entry further comprises:

when the size information in the first page table entry increases, calculating a base physical frame number by changing lower M bits of the physical frame number in the first page table entry to the second state; and when the physical frame number in the first page table entry is the same as the base physical frame number, maintaining the increased size information, and when the physical frame number of the first page table entry is not the same as the base physical frame number, decreasing the increased size information and change the valid information in the first page table entry to a previous value, and wherein M is ($\log_2$(a number of bits in the valid information in the first page table entry)×(the increased size information+1)).

17. The method according to claim 15, further comprising:

in the absence of a page table entry corresponding to a requested virtual page number in the controller, searching the page table entry corresponding to the requested virtual page number in the page table of the main memory; and reading a first page table entry of a page table entry subgroup or group comprising the page table entry corresponding to the requested virtual page number from the page table in the main memory, and storing the read first page table entry in the controller.

18. The method according to claim 17, wherein the searching the page table entry comprises:

determining whether a condition that all of the first predetermined number of bits in the valid information of the page table entry corresponding to the requested virtual page number are set to the first state, and the requested virtual page number is different from a base virtual page number obtained by changing lower N bits of the requested virtual page number to the second state is satisfied; and when the condition is not satisfied, storing the page table entry corresponding to the requested virtual page number in the controller, and wherein N is $\log_2$(a number of bits in the valid information in the page table entry corresponding to the requested virtual page number)×(the size information in the page table entry corresponding to the requested virtual page number+1).

19. The method according to claim 18, wherein the searching the page table entry comprises:

determining whether a condition that all of the first predetermined number of bits in the valid information of the page table entry corresponding to the requested virtual page number are set to the first state, and the requested virtual page number is different from a base virtual page number obtained by changing lower N bits of the requested virtual page number to the second state is satisfied; and when the condition is satisfied, reading a page table entry corresponding to the base virtual page number wherein N is $\log_2$(a number of bits in the valid information in the page table entry corresponding to the requested virtual page number)×(the size information in the page table entry corresponding to the requested virtual page number+1).

20. The method according to claim 17, wherein the searching the page table entry comprises:

when a page table entry corresponding to a requested virtual page number is absent in the TLB, and a first page table entry of a page table entry subgroup or group comprising the page table entry corresponding to the requested virtual page number is stored in the TLB, calculating a base virtual page number, an offset, and an index of each of the requested virtual page number and the virtual page number of the stored first page table entry;

when the base virtual page number of the requested virtual page number is the same as the base virtual page number of the stored virtual page number, and a bit of the valid information in the stored first page table entry corresponding to the index of the requested virtual page number is in the first state, determining that the stored first page table entry is available for use to obtain a physical frame number corresponding to the requested virtual page number;

calculating the physical frame number corresponding to the requested virtual page number by adding the offset of the requested virtual page number to a base physical frame number of a physical frame number of the stored page table entry;

calculating the base virtual page number of the requested virtual page number by changing lower N1 bits of the requested virtual page number to the second state, the offset of the requested virtual page number being a value before being changed to the second state to calculate the base virtual page number of the requested virtual page number, and the index of the requested virtual page number being upper K1 bits of the offset of the requested virtual page number, N1 being $\log_2$(a number of bits in the valid information in the page table entry corresponding to the requested virtual page number)×(the size information in the stored first page table entry+1)), and K1 being $\log_2$(the number of bits in the valid information in the page table entry corresponding to the requested virtual page number); and calculating the base virtual page number of the stored virtual page number by changing lower N2 bits of the stored virtual page number to the second state, the offset of the stored virtual page number being a value before being changed to the second state to calculate the base virtual page number of the stored virtual page number, and the index of the stored virtual page number being upper K2 bits of the offset of the stored virtual page number, N2 being $\log_2$(a number of bits in the valid information in the stored first page table entry)× (the size information in the stored first page entry+1)), and K2 being $\log_2$(the number of bits in the valid information in the stored first page table entry).

* * * * *